(12) United States Patent
Hennon

(10) Patent No.: US 11,781,676 B2
(45) Date of Patent: Oct. 10, 2023

(54) ZERO CAULK HYGIENIC SEALING STANDOFF

(71) Applicant: John Hennon, Wall, NJ (US)

(72) Inventor: John Hennon, Wall, NJ (US)

( * ) Notice: Subject to any disclaimer, the term of this patent is extended or adjusted under 35 U.S.C. 154(b) by 0 days.

(21) Appl. No.: 17/503,277

(22) Filed: Oct. 16, 2021

(65) Prior Publication Data

US 2023/0124714 A1    Apr. 20, 2023

Related U.S. Application Data

(60) Provisional application No. 63/086,283, filed on Oct. 1, 2020.

(51) Int. Cl.
    *F16L 3/02*    (2006.01)

(52) U.S. Cl.
    CPC ..................... *F16L 3/02* (2013.01)

(58) Field of Classification Search
    CPC ..... F16L 3/02; F16L 3/22; F16L 3/221; F16L 3/222; F16L 3/237
    USPC ........................... 411/546, 367; 248/49–74.5
    See application file for complete search history.

(56) References Cited

U.S. PATENT DOCUMENTS

| | | | | |
|---|---|---|---|---|
| 2,977,405 A * | 3/1961 | Warnock | ................ | H01B 17/14 174/138 R |
| 4,819,897 A * | 4/1989 | Gooding | ............... | F16B 7/0433 280/421 |
| 4,993,669 A * | 2/1991 | Dyer | ...................... | B65D 63/16 248/74.3 |
| 9,822,907 B1 * | 11/2017 | Hennon | .................. | F16L 3/133 |
| 2004/0238698 A1 * | 12/2004 | Shereyk | ............... | F16B 5/0685 248/74.2 |
| 2007/0295867 A1 * | 12/2007 | Hennon | ................ | F16L 3/1075 248/74.4 |
| 2010/0308183 A1 * | 12/2010 | Hennon | .................. | F16L 3/222 248/67.5 |
| 2010/0308184 A1 * | 12/2010 | Hennon | ................ | F16L 3/1091 248/74.1 |
| 2012/0217353 A1 * | 8/2012 | Hennon | ................ | F16L 3/1016 29/428 |
| 2016/0116083 A1 * | 4/2016 | Olsen | ..................... | F16L 3/1091 248/74.1 |
| 2016/0340860 A1 * | 11/2016 | Lisin | ....................... | F16L 59/21 |
| 2018/0038518 A1 * | 2/2018 | Hennon | ................ | F16L 3/1091 |
| 2020/0326019 A1 * | 10/2020 | Hennon | ................ | F16L 3/1091 |
| 2021/0088165 A1 * | 3/2021 | Stern | ........................ | F16L 41/12 |

* cited by examiner

*Primary Examiner* — Christopher Garft
(74) *Attorney, Agent, or Firm* — Z IP Law PLLC

(57) ABSTRACT

Hygienic standoffs to seal nuts, bolts, anchor brackets, and other mounting hardware used within tube and pipe hanger systems within industrial manufacturing facilities that require clean, sanitary, and sterile environments and more specifically to hygienic standoffs that do not require the use of caulk, adhesives, acrylic latex, silicone, polyurethane, rubber, or other sealing compounds. The hygienic standoffs instead seal to a pipe, tube, or other surface using an interlocking ridged seal of elastomeric material to form a watertight seal preventing the buildup of dirt, liquid, bacteria, and other contaminants.

10 Claims, 27 Drawing Sheets

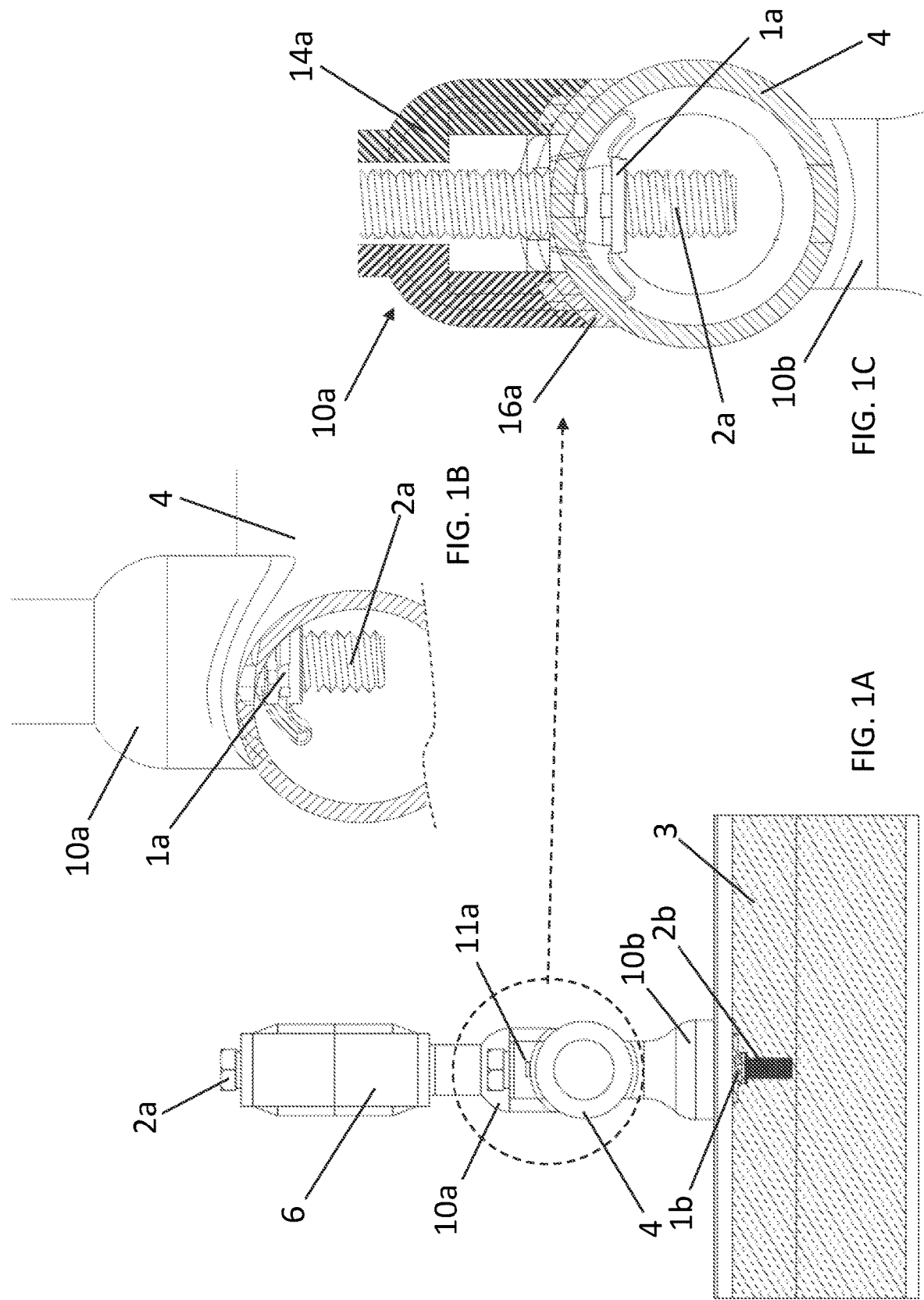

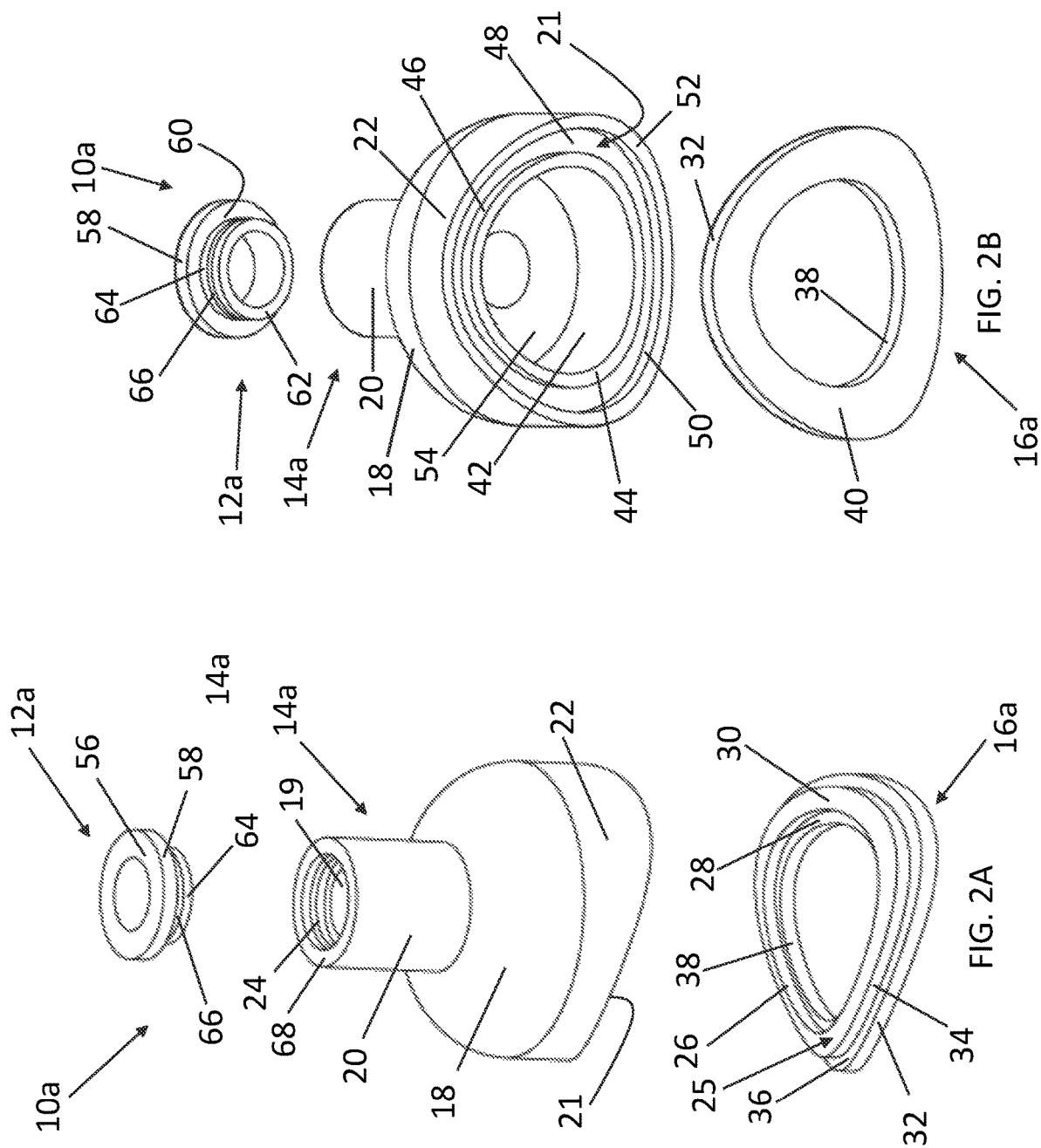

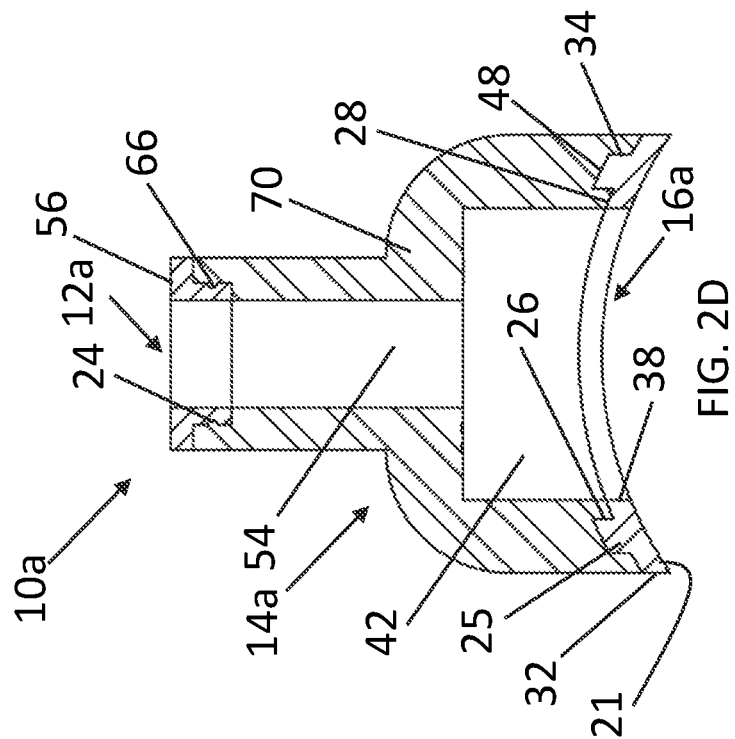
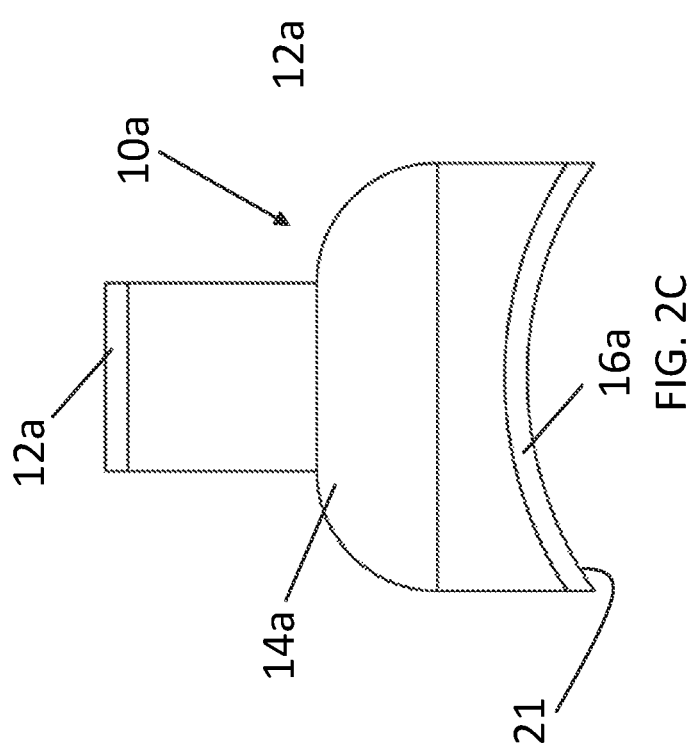

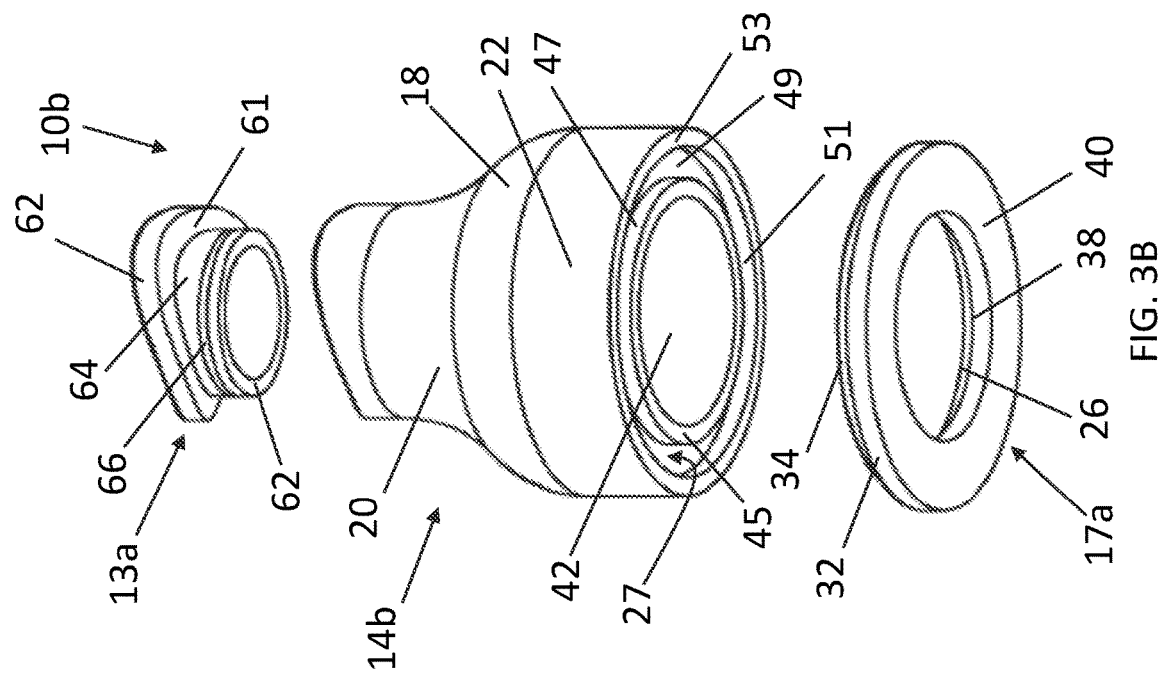
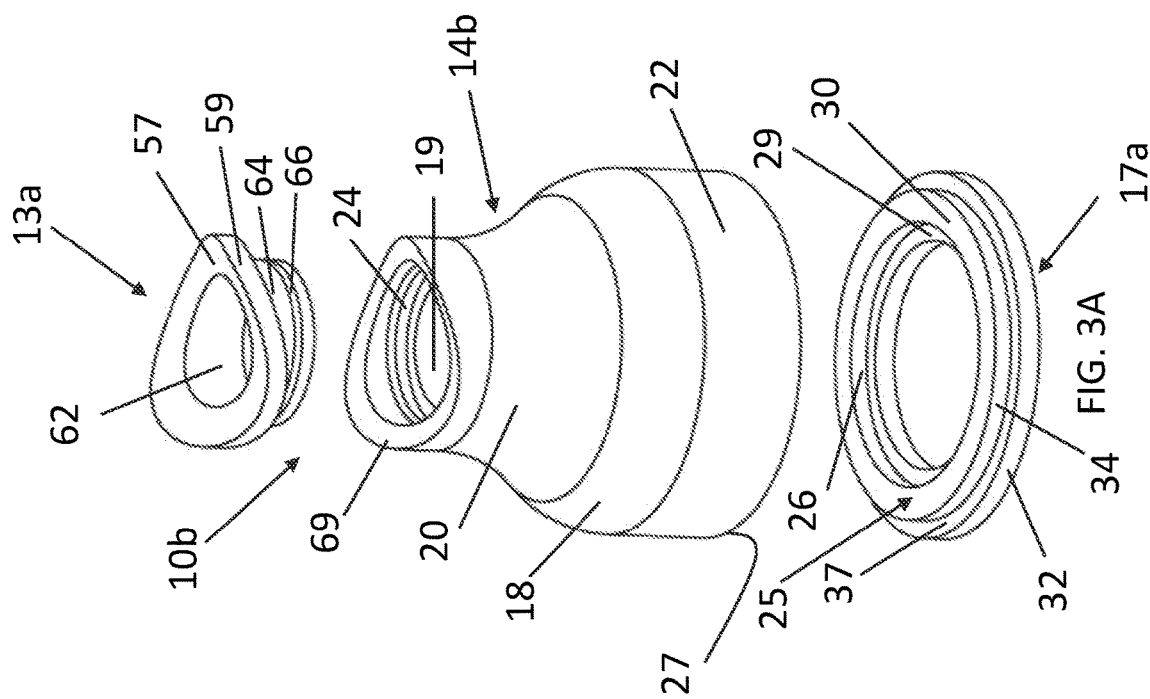

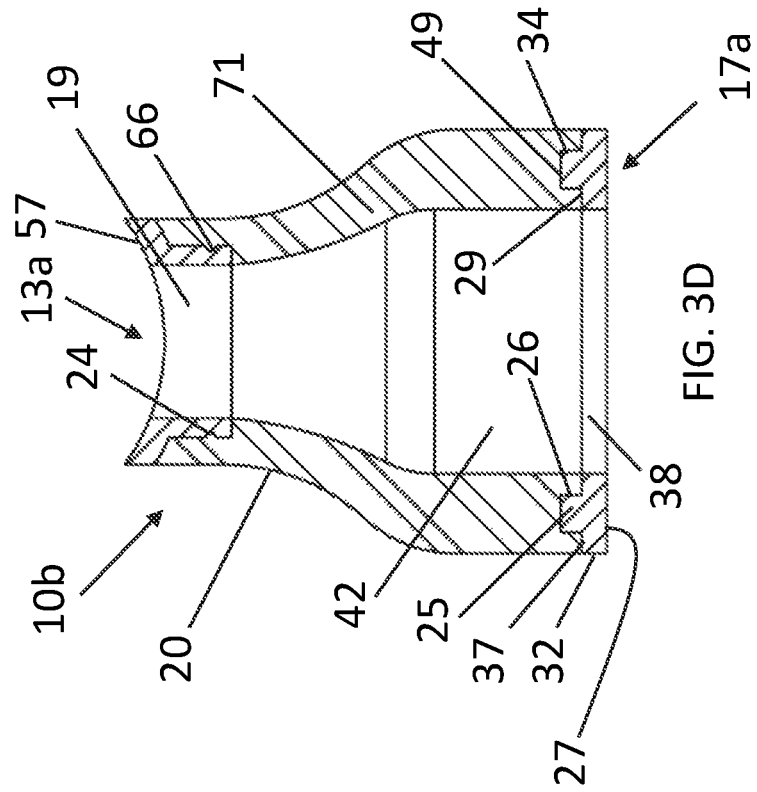
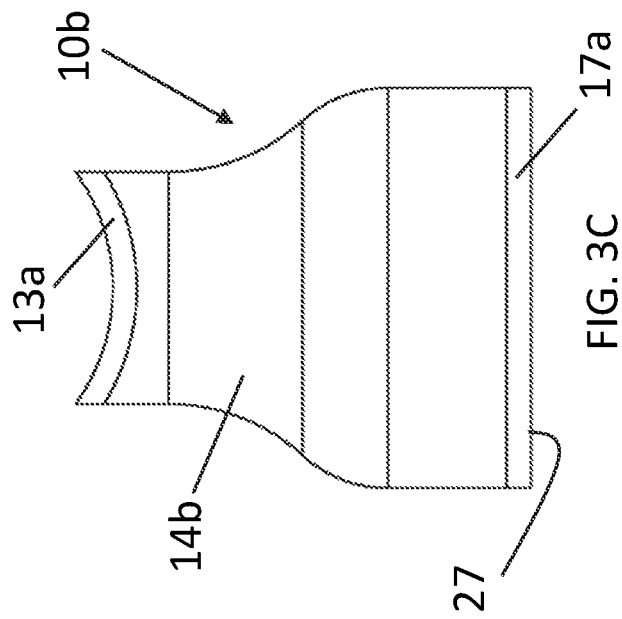

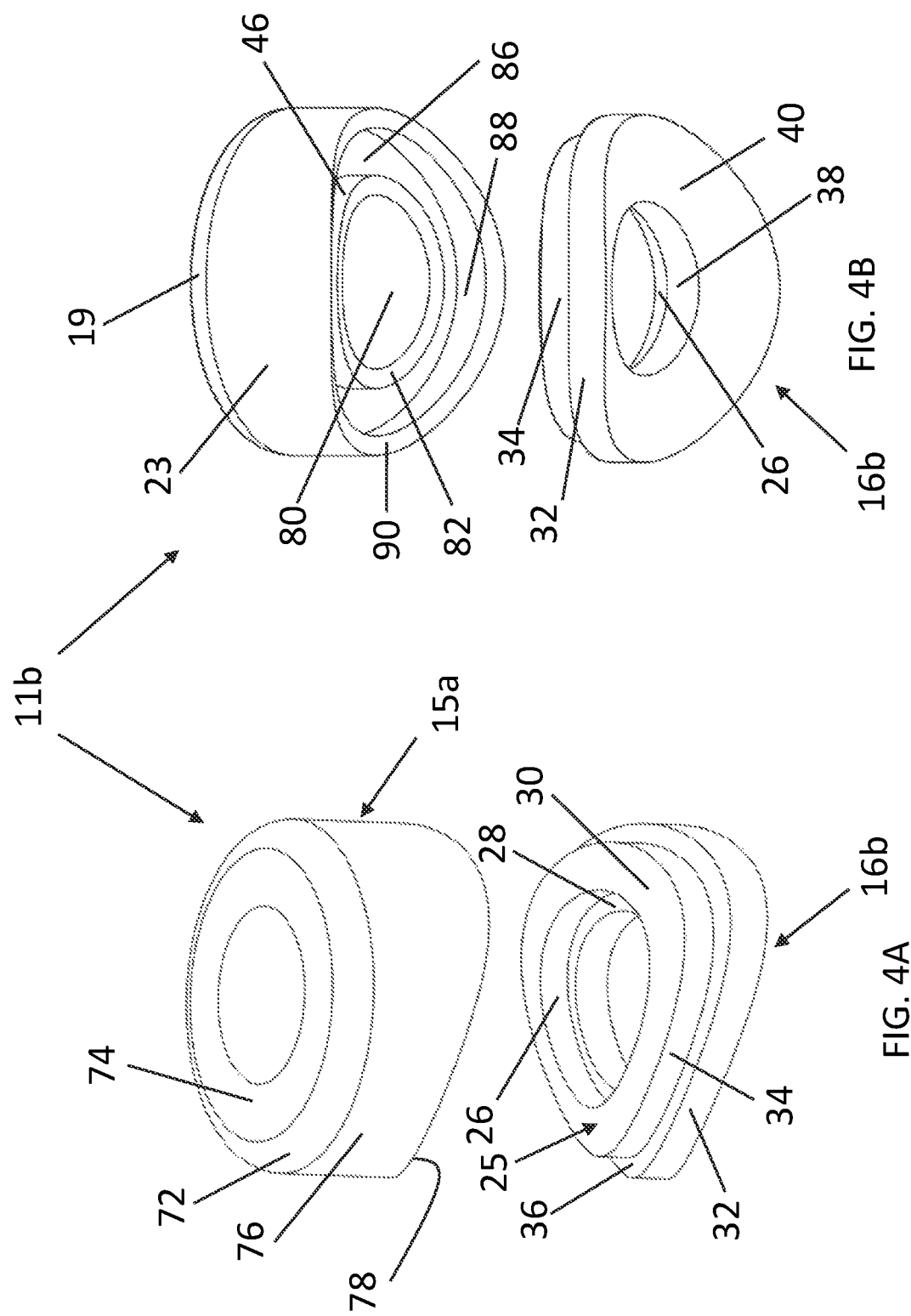

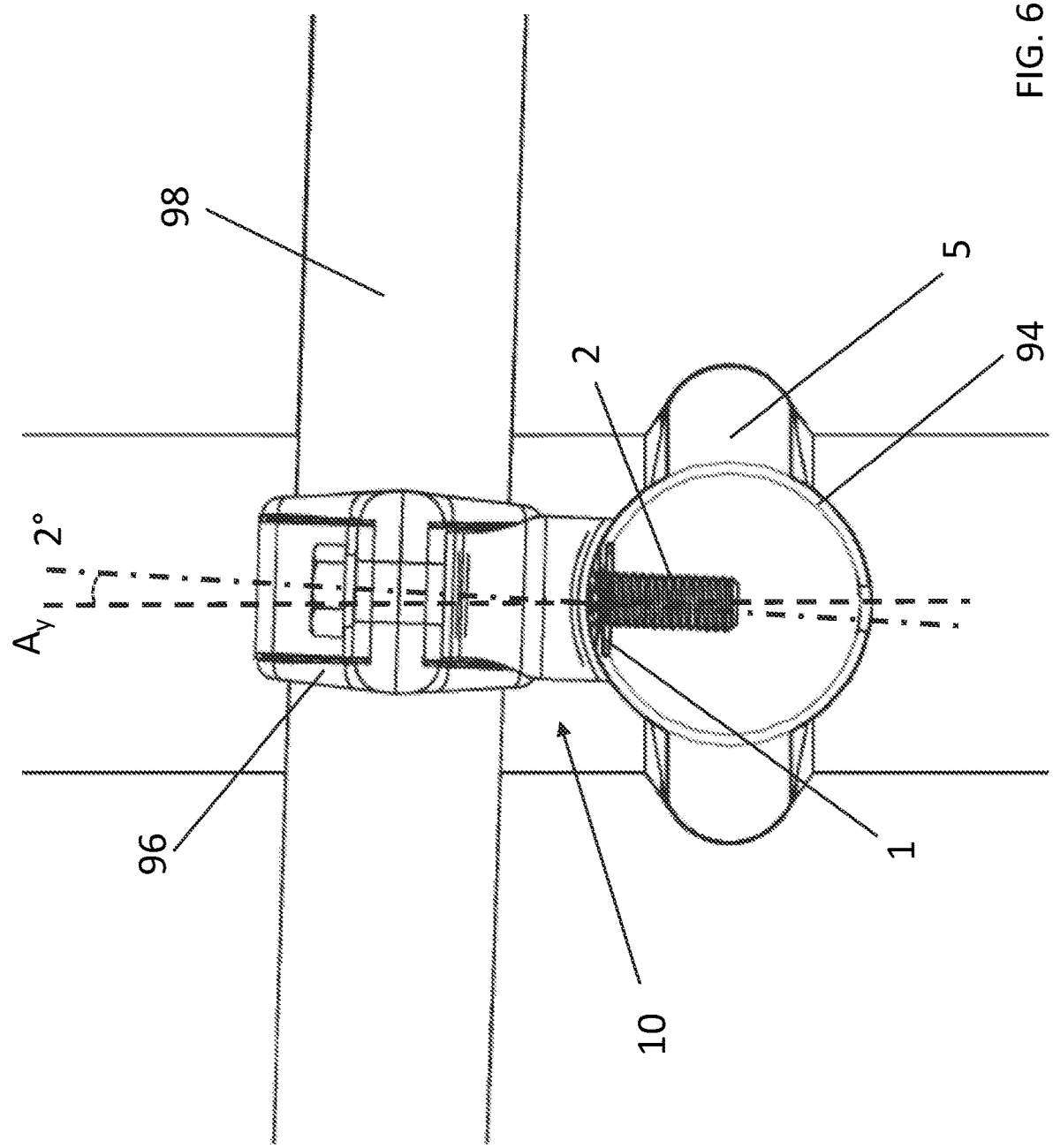

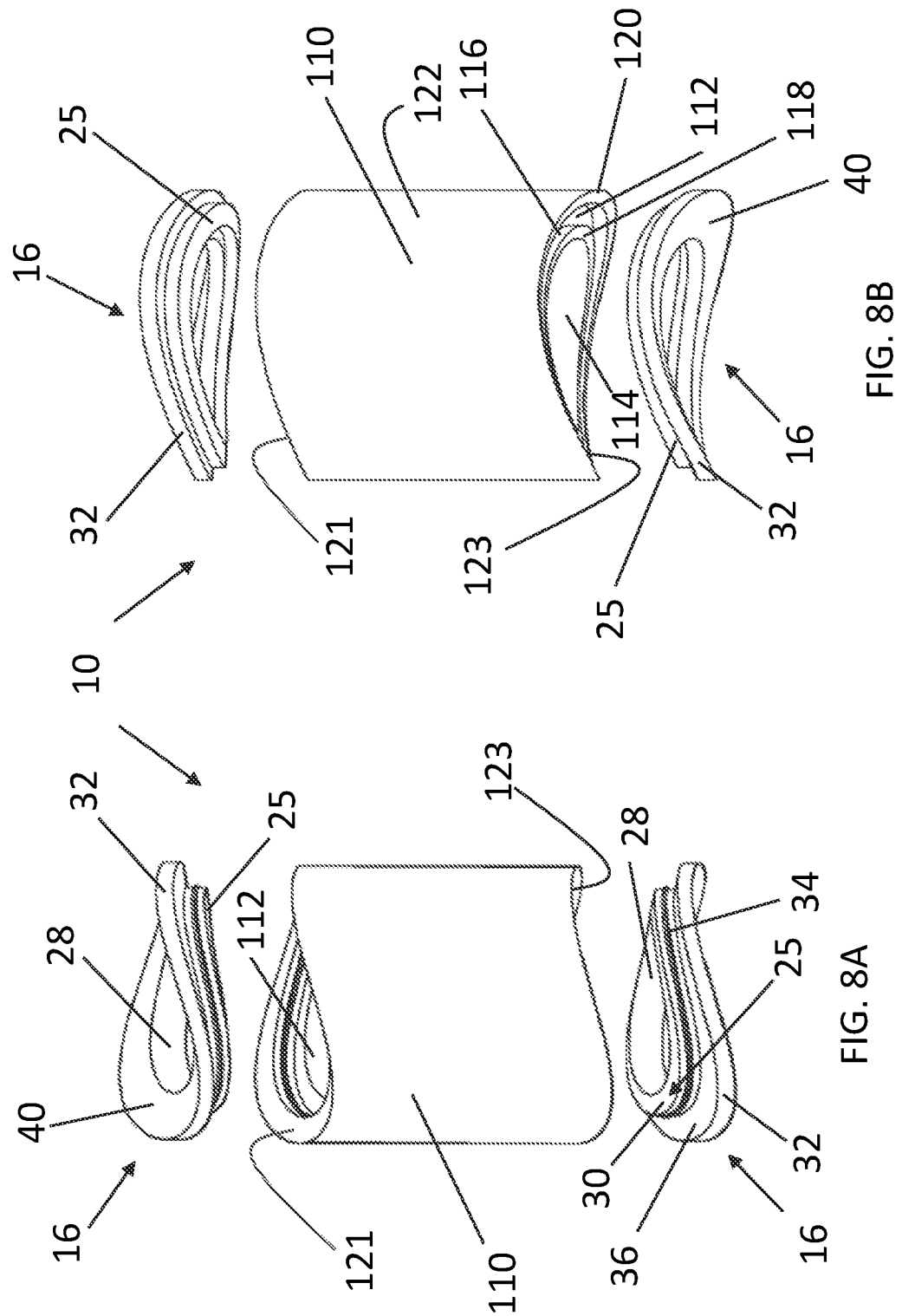

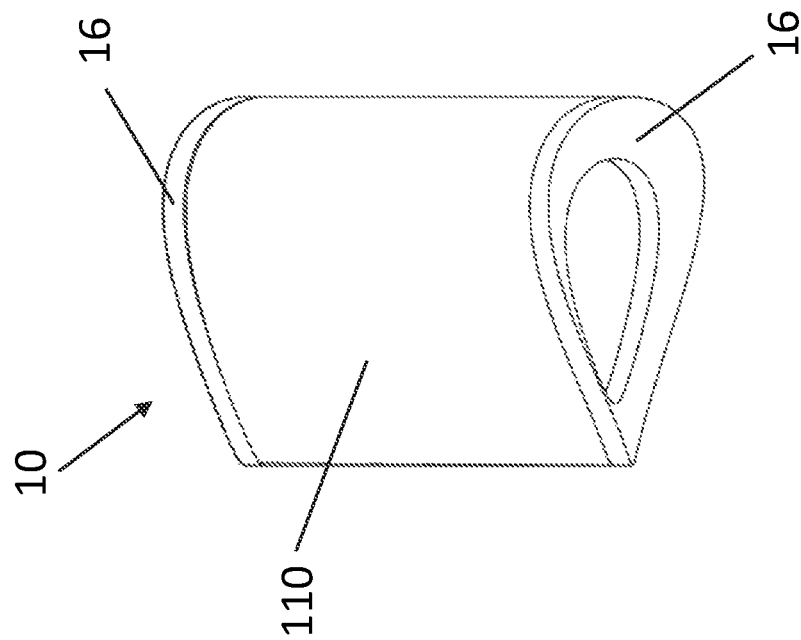
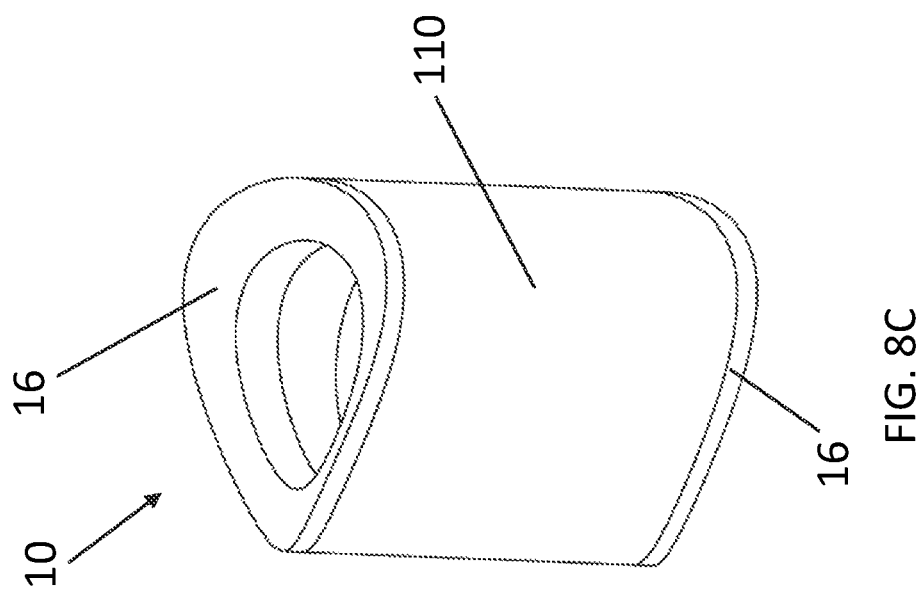

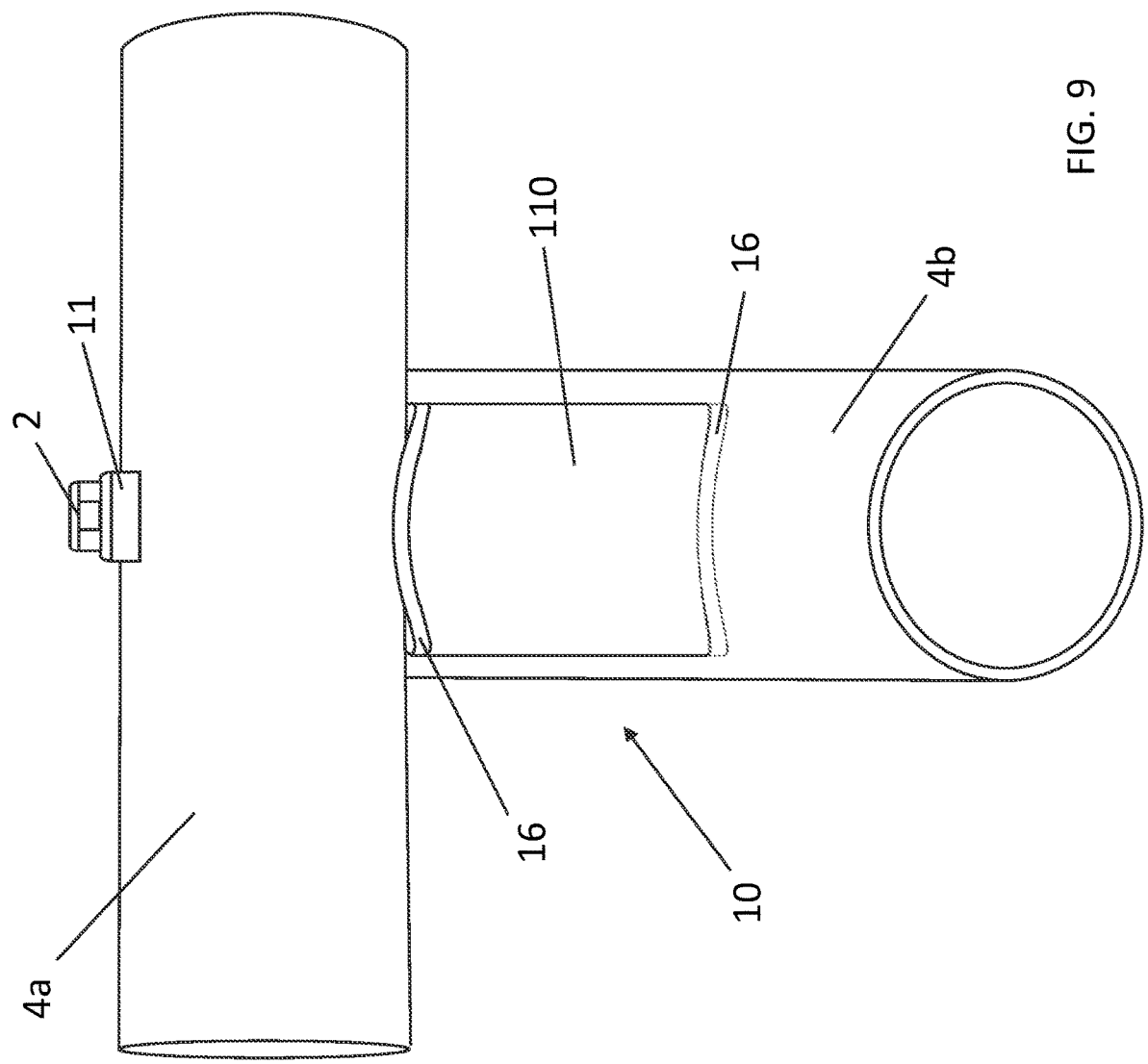

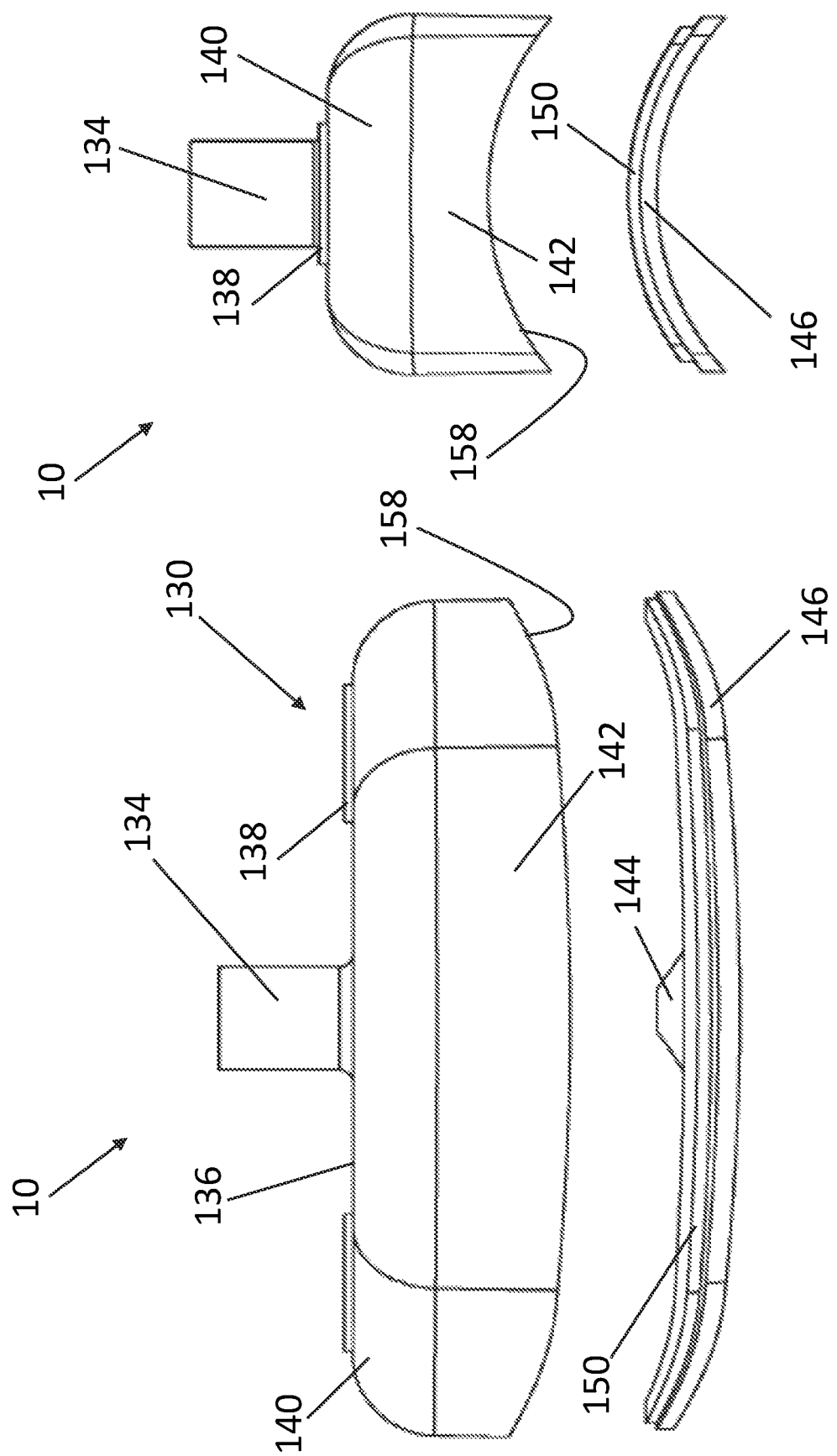

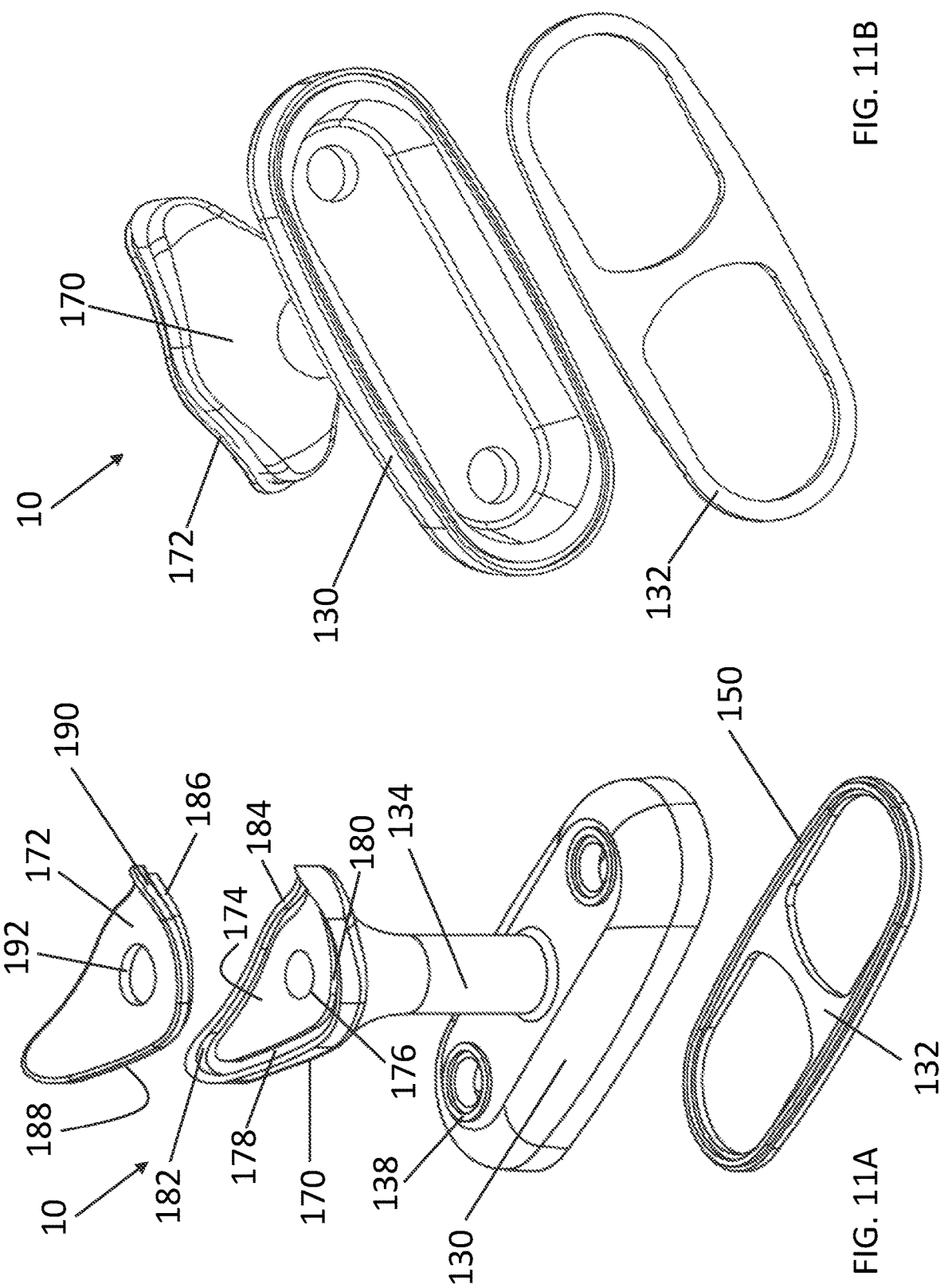

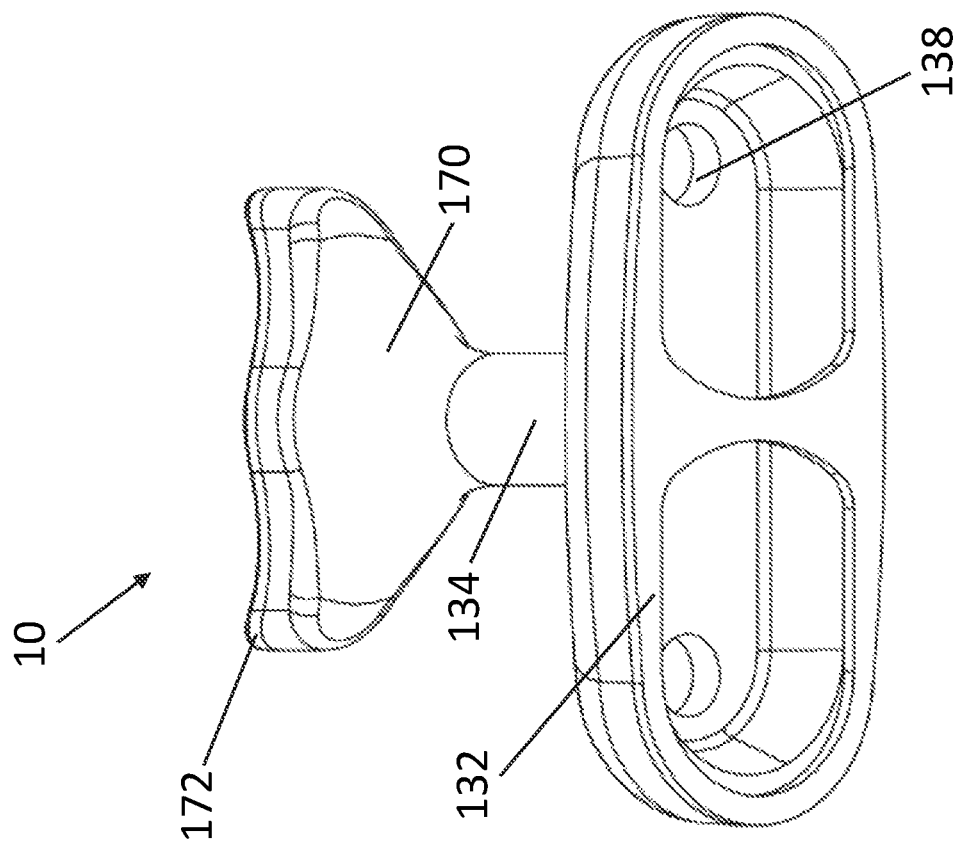
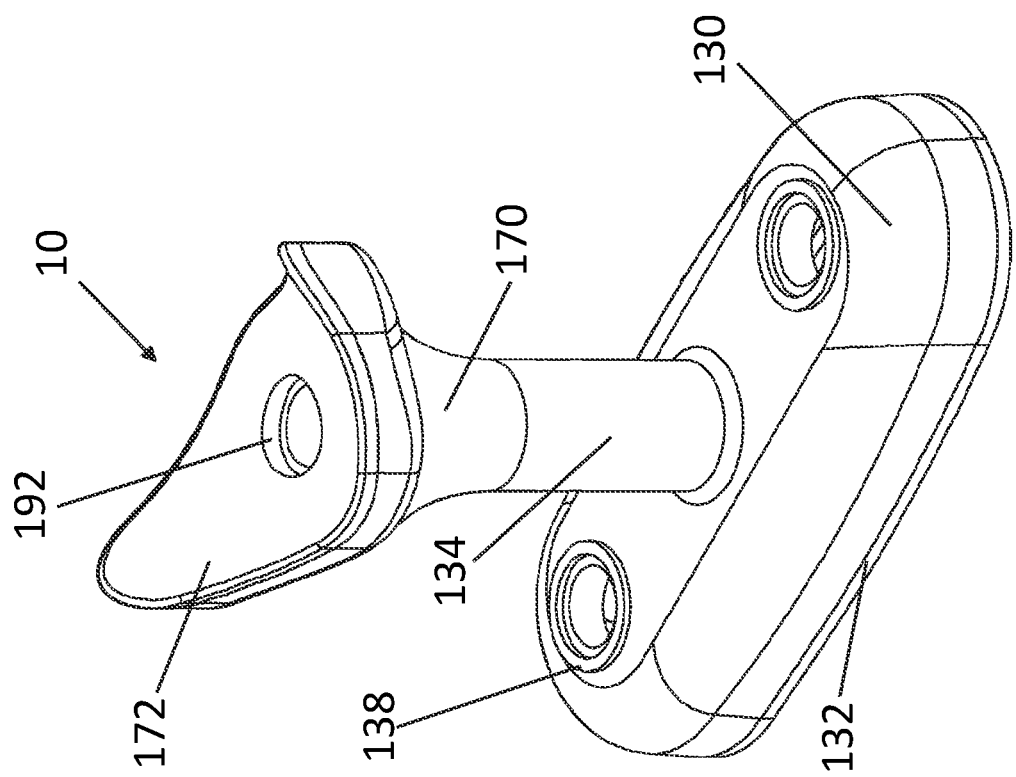
FIG. 11D
FIG. 11C

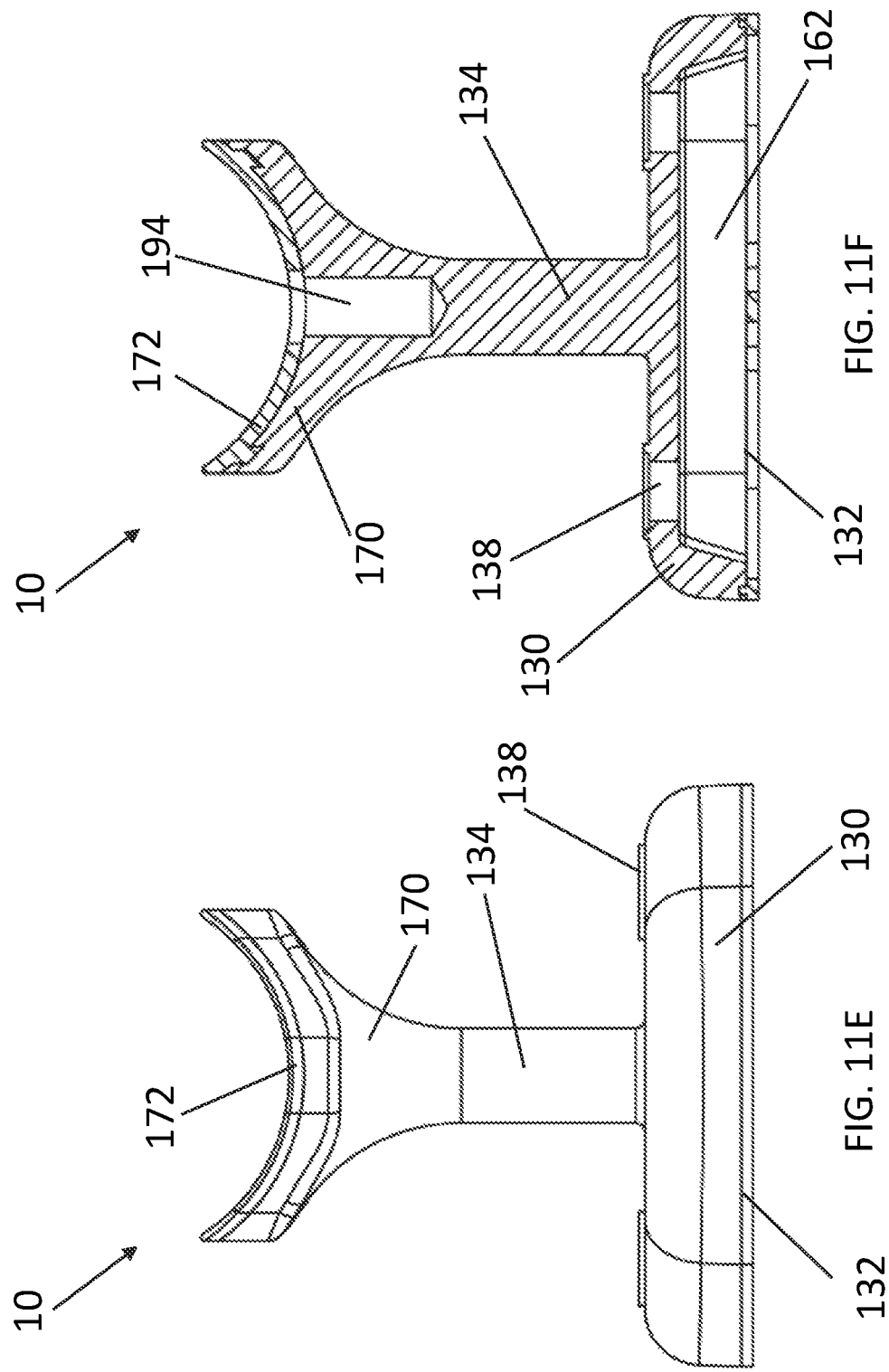

ZERO CAULK HYGIENIC SEALING STANDOFF

RELATED PATENT APPLICATION

This application claims the benefit of U.S. Provisional Patent Application No. 63/086,283 filed on Oct. 1, 2020 entitled Zero Caulk Hygienic Sealing Standoff which is hereby incorporated herein by reference in its entirety.

FIELD OF THE INVENTION

The present invention relates to hygienic standoffs to seal nuts, bolts, anchor brackets, and other mounting hardware used within tube and pipe hanger systems within industrial manufacturing facilities that require clean, sanitary, and sterile environments and more specifically to hygienic standoffs that do not require the use of caulk, adhesives, acrylic latex, silicone, polyurethane, rubber, or other sealing compounds. The hygienic standoffs instead seal to a pipe, tube, or other surface using an interlocking ridged seal of elastomeric material to form a watertight seal preventing the buildup of dirt, liquid, bacteria, and other contaminants.

BACKGROUND OF THE INVENTION

Pipe and tube brackets and hangers are well known for their use in supporting piping and tubing systems in residential and commercial buildings, as well as their use throughout numerous sterile environments in industrial manufacturing facilities, for example, food, dairy, beverage, chemical, personal care, bio-processing, and pharmaceutical manufacturing industries. With respect to industrial facilities, especially those in which clean rooms, sanitary and sterile environments which are critical to the manufacturing process, the known pipe supports must be configured to have a smooth contact surface to prevent the buildup of any other contaminants from collecting and impacting the effect of the clean, sanitary, sterile environments. Pipe hangers and mounting bracket configurations are made to surround pipes and tubes and commonly have inner layers or blocks made from elastomeric or rigid plastic materials to provide some combination of dampening, shock absorption, and insulation. The elastomeric or rigid plastic materials must seal around the pipe or tube to prevent any buildup of dirt, liquid, bacteria or other contaminants. All exposed surfaces of the bracket or hanger shall be smooth with no irregular surfaces to also prevent the buildup of dirt, liquid, bacteria, or other contaminants. In mounting the bracket or hanger around a pipe or tube, an upper and lower piece are connected using threaded rods, nuts and bolts, fasteners, or other mounting hardware. The crevices and irregular surfaces of the mounting hardware may be difficult to clean causing dirt, liquid, bacteria other contaminants to build up. The mounting hardware is therefore commonly sealed using caulk, adhesives, or other sealing compounds. The application of caulk or other sealing compounds is a labor-intensive step that requires several hours of drying time to complete the piping and tubing system installation. Overtime, caulk commonly breaks down and cracks are formed. A common cause of caulk cracking is the uneven thermal cycling of the material of two mated parts of the mounting hardware. One of the mating surfaces may cool and heat faster than the other material and the uneven expansions and contractions will cause the caulk to fail and crack. The zero caulk hygienic standoffs of the present invention remove the requirement to seal the mounting hardware using caulk, adhesives, acrylic latex, silicone, polyurethane, rubber, or other sealing compounds.

SUMMARY OF THE INVENTION

The present invention is a hygienic standoff used to seal nuts, bolts, anchor brackets, and other mounting hardware used within tube and pipe hanger systems within industrial facilities. By sealing the mounting hardware, the hygienic standoff prevents the buildup of dirt, liquid, bacteria, and other contaminants within clean, sanitary, and sterile environments. The hygienic standoff does not require caulk or other sealing compounds to seal around the mounting hardware. Embodiments of the hygienic zero caulk standoff instead comprises a zero caulk spacer and zero caulk ridged seal that interlock to form a watertight seal. In other embodiments, the zero caulk standoff comprises a zero caulk spacer, zero caulk ridged seal and a zero caulk gasket that interlock to form a watertight seal. In still other embodiments, the zero caulk standoff comprises a zero caulk washer and zero caulk ridged seal. The zero caulk standoff therefore has various configurations and embodiments to surround and cover various mounting hardware used to attach and secure piping systems including blindsided applications using insulated metal panels (IMP). An IMP comprises two sections of corrugated sheet metal with varying thickness of foam insulation sandwiched between the panels of corrugated sheet metal creating a blindside for securing the mounting hardware of a piping system. A jack nut that has a collapsible well is affixed within the surface of the IMP and a bolt secures the zero caulk standoff and piping to the IMP. One or more zero caulk standoffs surround and cover all or a portion of a bolt and jack nut or other mounting hardware while supporting and/or aligning the piping. In other applications the zero caulk standoff may be used with block style tube and pipe hangers to secure piping to ceiling joists or directly to the flat surfaces of ceilings, walls, and floors. The zero caulk standoff may also be used with rack systems to support multiple pipe hangers to direct piping in different directions as required by the sanitary workflow within the industrial facility. Some embodiments of the zero caulk standoff have one or more curved surfaces to seal the irregular surfaces of mounting hardware and prevent the buildup of dirt, liquid, bacteria, and other contaminants along the surface of piping, tubing, or other curved surfaces.

The zero caulk spacer of the zero caulk standoff may be made of smooth polished stainless steel or rigid plastic to prevent crevices or irregular surfaces or be made of other antibacterial and/or antimicrobial material. In some embodiments, the zero caulk spacer is formed with a hemispherical body, a neck, and a base with an opening configured for the insertion of mounting hardware through the zero caulk spacer. The cylindrical neck is formed with a surface that is flat or that is formed with either a convex or concave curvature. In some embodiments, a protrusion is formed along the interior surface of the cylindrical neck. The protrusion is configured to interlock with a zero caulk gasket to form a watertight seal. In some embodiments, a circumferential channel is formed within and along the flat or curved surface of the neck of the zero caulk spacer. The channel is configured to interlock with a zero caulk ridged seal to form a watertight seal.

In some embodiments, the base of the zero caulk spacer is formed with a surface that is flat or with a surface that is formed with either a convex or concave curvature. In some embodiments, a protrusion is formed along the interior surface of the base. The protrusion is configured to interlock with a zero caulk gasket to form a watertight seal. In some embodiments, a circumferential channel is formed within and along the flat or curved surface of the base of the zero caulk spacer. The channel is configured to mate and interlock with a zero caulk ridged seal to form a watertight seal.

The zero caulk washer as an embodiment of the zero caulk standoff comprises a zero caulk washer cap and a zero caulk ridged seal. The zero caulk washer cap may be made of smooth polished stainless steel or rigid plastic to prevent crevices or irregular surfaces or be made of other antibacterial and/or antimicrobial material. In embodiments of the zero caulk washer, the zero caulk washer cap is cylindrical in shape with an opening configured for the insertion of mounting hardware through the zero caulk washer cap. The zero caulk washer cap has an upper surface and a lower surface and either surface may be flat or may be formed with either a convex or concave curvature. In some embodiments of the zero caulk washer cap, a protrusion is formed along an interior surface of the zero caulk washer cap. The protrusion is configured to interlock the zero caulk washer cap with a zero caulk gasket to form a watertight seal. In some embodiments of the zero caulk washer cap, a circumferential channel is formed within and along the flat or curved upper and/or lower surface. The channel is configured to interlock with a zero caulk ridged seal to form a watertight seal.

The zero caulk ridged seal may be of elastomeric material that may have antibacterial and/or antimicrobial properties. In some embodiments, the zero caulk ridged seal is formed as a flat cylindrical disk with the ridge extending from one side of the surface of the seal. In other embodiments, the zero caulk ridged seal is pre-formed with a convex or concave curvature with the ridge extending from and along the curved surface. The ridge of the zero caulk ridged seal is configured to mate with either a flat or curved surface of a zero caulk spacer or a zero caulk washer cap and interlock to form a watertight seal. In alternative embodiments, the zero caulk spacer or zero caulk washer cap may be formed with a ridge and the zero caulk seal may be formed with a channel and be mated to interlock to form a watertight seal.

Further embodiments of the zero caulk standoff comprise a zero caulk gasket that may be of elastomeric material that may have antibacterial and/or antimicrobial properties. The zero caulk gasket is formed as a disk that may have an opening configured for the insertion of mounting hardware through the zero caulk gasket. An upper surface of the zero caulk gasket may be flat or may be formed with either a convex or concave curvature. A lower surface of the zero caulk gasket has a cylindrical wall with a groove formed along the exterior surface of the cylindrical wall. The groove is configured to snap in and interlock with a zero caulk spacer or a zero caulk washer cap to form a watertight seal. In alternative embodiments, the zero caulk spacer or zero caulk washer cap may be formed with a groove and the zero caulk seal may be formed with a protrusion and be mated to interlock to form a watertight seal.

The lower surface of the zero caulk washer cap may be flat or may be formed with either a convex or concave curvature. In the lower surface of the zero caulk washer cap a circumferential channel is formed within and along the flat or curved surface. The channel is configured to interlock with a zero caulk ridged seal to form a watertight seal. The zero caulk gasket is configured to cover and seal an opening in a pipe or tube, a bolt head, a portion of a bolt or surround and seal other type of mounting hardware.

In some embodiments, the zero caulk spacer is formed with circumferential channels in both the top surface of the neck and in the bottom of the base to enclose hardware attaching upper and lower piping or to attach piping to a rack. In some embodiments, the mating zero caulk washer and zero caulk spacer on one of either the neck or base is formed with a convex or concave curvature that is in a different radial direction than the direction of the convex or concave curvature on the opposite end of either the neck or the base. For example, if the curvatures are directionally perpendicular to one another then piping secured and aligned by the direction of curvature of the neck is directed in a perpendicular direction to piping secured and aligned by the direction of curvature of the base. The upper and lower curvatures may have the same directional radial and convex or concave curvature or be in any two different directional radial and have different convex or concave curvatures to align the piping in different directions from one another as required. Embodiments of a zero caulk washer may also be formed with upper and lower surfaces having circumferential channels with the same or different radial directions and with the same or different convex or concave curvatures.

The curvature of the zero caulk standoff may further provide for piping to be aligned at a slope of 1° or 2° as required in some industrial standards for clean room in order to have proper gravity drainage through the pipe. A hole can simply be drilled at the desired angle of slope with respect to the center axis of the pipe and a jack nut can be inserted through the hole and crimped. The zero caulk standoff is then placed over the rivet of the jack nut along the outer surface of the pipe and aligned at the angle drilled through the pipe. By inserting a bolt through the zero caulk standoff and screwing the bolt into the jack nut, the well of the jack nut collapses to the interior surface of the pipe as the bolt is tightened aligning the pipe at the specified gravity drainage angle. The curvature of the zero caulk standoff maintains the pipe at the proper angle as the mounting hardware is attached to other piping, IMP, a rack, or another type of flat or curved surface.

Through preforming a curvature in the zero caulk ridged seal and mating and interlocking to a curvature in the top and/or base of the zero caulk spacer or a zero caulk washer, the zero caulk standoff provides a waterproof seal and cleanable surface with no exposed threads, crevices or irregular surfaces. The various embodiments and designs of the zero caulk standoff also allows for mixing and matching of components to provide for several configuration for sealing bolts, anchor brackets, toggle bolt fasteners and other attachment fixtures to both flat and curved surfaces. The zero caulk standoff further protects and encapsulates attachment fixtures preventing rust or degradation to maintain secure attachment of piping systems to racks, IMP, and other structural supports. The convex or concave curvature of the surfaces of the zero caulk standoff also provides for the alignment of piping in one or more directions and aligning piping at the specified slope for proper gravity drainage reducing clogs or debris forming within the piping system. In further embodiments, the zero caulk standoff may be formed as an anchor bracket, as an anchor bracket with a pedestal and cradle or in various other configuration as described and shown to meet the sterile requirements of the industrial facility. The dimensions and shapes of the zero caulk standoff may therefore be of any size and style and the curvatures or flat surfaces may be in any suitable form with the stainless steel and antimicrobial materials of the zero caulk standoff being impervious to and not reacting with caustic solutions that may be utilized in cleaning a clean, sterile or sanitary room within an industrial food, dairy, beverage, chemical, personal care, bio-processing, and pharmaceutical manufacturing facility.

OBJECTS AND ADVANTAGES OF THE INVENTION

An object and advantage of the present invention is a novel support assembly which simplifies the total installation of a pipe hanger system and allows the installer to seal the hardware and other attachment fixtures for the pipe hangers and anchor brackets without the need for caulk, adhesives, acrylic latex, silicone, polyurethane, rubber, or other sealing compounds which takes both time to apply and drying time to have the fixtures be properly sealed and water-resistant.

Another object and advantage of the present invention is a novel support assembly that protects the support bolts and other attachment fixtures extending through the piping, ceiling, wall, floor, panel, equipment frame or racks and encapsulates that portion of the exposed bolts and other attachment fixtures within the clean room to encase and protect them from caustic cleaning solutions or the like utilized to sanitize the clean room.

Another object and advantage of the present invention is a novel support assembly that provides for the installation of block style tube and pipe hangers.

Another object and advantage of the present invention is a novel support assembly that provides for the adjustment of the angle of piping and tubing to a specified gravity drainage angle.

Another object and advantage of the present invention is a hygienic zero caulk standoff with a curvature for mounting directly on the curved surface of a pipe.

Another object and advantage of the present invention is a hygienic zero caulk standoff that creates a waterproof seal around bolts and other attachment fixtures without caulk, adhesives, acrylic latex, silicone, polyurethane, rubber, or other sealing compounds.

Another object and advantage of the present invention is a hygienic zero caulk standoff having an upper curvature in a different direction than a lower curvature to direct and support upper and lower piping installed in different directions.

Another object and advantage of the present invention is a hygienic zero caulk standoff comprising in some embodiments a spacer formed with a channel and a ridged seal that interlock to form a waterproof seal to enclose bolts or other attachment fixtures within a hygienic environment.

Another object and advantage of the present invention is a hygienic zero caulk standoff comprising in some embodiments a spacer formed with a ridge and a seal formed with a channel that interlock to form a waterproof seal to enclose bolts or other attachment fixtures within a hygienic environment.

Another object and advantage of the present invention is a hygienic zero caulk standoff comprising a spacer formed with a curvature and a seal formed with a curvature to enclose and seal bolts or other attachment fixtures on a curved surface.

Another object and advantage of the present invention is a hygienic zero caulk standoff comprising a spacer formed with a curvature having a channel within and along the curvature and a seal formed with a curvature having a ridge extending along the curvature, the curvature of the spacer mating with the curvature of the seal and the channel of the spacer and the ridge of the seal interlocking to form a waterproof seal to enclose and seal bolts or other attachment fixtures on a curved surface.

Another object and advantage of the present invention is a hygienic zero caulk standoff comprising in some embodiments a washer formed with a channel and a ridged seal that interlock to form a waterproof seal to enclose bolts or other attachment fixtures within a hygienic environment.

Another object and advantage of the present invention is a hygienic zero caulk standoff comprising in some embodiments a washer formed with a ridge and a seal formed with a channel that interlock to form a waterproof seal to enclose bolts or other attachment fixtures within a hygienic environment.

Another object and advantage of the present invention is a hygienic zero caulk standoff comprising a washer formed with a curvature and a seal formed with a curvature to enclose and seal bolts or other attachment fixtures on a curved surface Another object and advantage of the present invention is a hygienic zero caulk standoff comprising a washer formed with a curvature having a channel within and along the curvature and a seal formed with a curvature having a ridge extending along the curvature, the curvature of the washer mating with the curvature of the seal and the channel of the washer and the ridge of the seal interlocking to form a waterproof seal to enclose and seal bolts or other attachment fixtures on a curved surface.

Another object and advantage of the present invention is a hygienic zero caulk standoff comprising a zero caulk gasket and a zero caulk spacer with the zero caulk gasket snapping into the zero caulk spacer to enclose and seal bolts or other attachment fixtures.

Another object and advantage of the present invention is a hygienic zero caulk standoff suitable for enclosing bolts and other attachment fixtures that are mounted vertically, horizontally, and diagonally within piping support systems and racks.

Another object and advantage of the present invention is a hygienic zero caulk standoff comprising in some embodiments an oval shaped anchor bracket formed with a channel and an oval shaped ridged sealing washer that interlock to form a waterproof seal to enclose bolts or other attachment fixtures within a hygienic environment.

Another object and advantage of the present invention is a hygienic zero caulk standoff comprising in some embodiments an oval shaped anchor bracket formed with a ridge and a sealing washer formed with a channel that interlock to form a waterproof seal to enclose bolts or other attachment fixtures within a hygienic environment.

Another object and advantage of the present invention is a hygienic zero caulk standoff comprising a cradle bracket formed with a curvature and a sealing pad formed with a curvature to enclose and seal bolts or other attachment fixtures on a curved surface Another object and advantage of the present invention is a hygienic zero caulk standoff comprising a cradle bracket formed with a curvature having a channel within and along the curvature and a sealing pad formed with a curvature having a ridge extending along the curvature, the curvature of the cradle bracket mating with the curvature of the sealing pad and the channel of the cradle bracket and the ridge of the sealing pad interlocking to form a waterproof seal to enclose and seal bolts or other attachment fixtures on a curved surface.

These and other features, advantages and improvements according to this invention will be better understood by reference to the following detailed description and accompanying drawings. While references may be made to top, bottom, upper, lower, vertical and horizontal, and similar directional terms, these terms are used merely to describe the relationship of components and not to limit the installation or use of the present invention to any one orientation.

BRIEF DESCRIPTION OF THE DRAWINGS

Some embodiments of the present invention are illustrated as an example and are not limited by the figures of the accompanying drawings, in which like references may indicate similar elements and in which:

FIG. 1A is an elevation view of embodiments of the zero caulk standoff of the present invention shown in a first embodiment supporting a block-style pipe hanger, shown in a second embodiment supporting a pipe mounted to an insulated metal panel (IMP), and shown in a third embodiment sealing the bolt affixing the pipe to the IMP;

FIG. 1B is a cross-sectional view along the pipe showing one of the embodiments of the zero caulk standoff of the present invention shown in FIG. 1A;

FIG. 1C is a cross-sectional view through the embodiment of the zero caulk standoff of the present invention shown in FIG. 1B;

FIG. 2A is a perspective view from the top of the components of an embodiment of the zero caulk standoff of the present invention comprising a zero caulk gasket, a zero caulk spacer, and a zero caulk ridged seal;

FIG. 2B is a perspective view from the bottom of the components of the embodiment of the zero caulk standoff of FIG. 2A;

FIG. 2C is an elevation view of an assembled embodiment of the zero caulk standoff of FIG. 2A;

FIG. 2D is a cross-sectional view of the assembled embodiment of the zero caulk standoff of FIG. 2C;

FIG. 3A is a perspective view from the top of the components of another embodiment of the zero caulk standoff of the present invention comprising a zero caulk gasket, a zero caulk spacer, and a zero caulk ridged seal;

FIG. 3B is a perspective view from the bottom of the components of the embodiment of the zero caulk standoff of FIG. 3A;

FIG. 3C is an elevation view of an assembled embodiment of the zero caulk standoff of FIG. 3A;

FIG. 3D is a cross-sectional view of the assembled embodiment of the zero caulk standoff of FIG. 3C;

FIG. 4A is a perspective view from the top of the components of an embodiment of the zero caulk standoff of the present invention comprising a zero caulk washer cap and a zero caulk ridged seal;

FIG. 4B is a perspective view from the bottom of the components of the embodiment of the zero caulk standoff of FIG. 4A;

FIG. 6 is an elevation view of an embodiment of a zero caulk standoff of the present invention aligning a pipe at an angle for proper drainage;

FIG. 8A is a perspective view from the top of the components of another embodiment of the zero caulk standoff of the present invention comprising a tubular spacer and two zero caulk ridged seals;

FIG. 8B is a perspective view from the bottom of the components of the embodiment of the zero caulk standoff of FIG. 8A;

FIG. 8C is a perspective view from the top of the assembled embodiment of the zero caulk standoff of FIG. 8A;

FIG. 8D is a perspective view from the bottom of the assembled embodiment of the zero caulk standoff of FIG. 8A;

FIG. 9 is a perspective view of the embodiment of the zero caulk standoff of the present invention of FIG. 8A aligning two pipes in different directions;

FIG. 10B is an elevation view from the side of the components of the embodiment of the zero caulk standoff of FIG. 10A;

FIG. 10C is an elevation view from the end of the components of the embodiment of the zero caulk standoff of FIG. 10A;

FIG. 11A is a perspective view from the top of the components of a further embodiment of the zero caulk standoff of the present invention comprising a zero caulk anchor bracket, a zero caulk oval ridged sealing washer, a pedestal, a zero caulk cradle bracket; and a zero caulk sealing pad;

FIG. 11B is a perspective view from the bottom of the components of the embodiment of the zero caulk standoff of FIG. 11A;

FIG. 11C is a perspective view from the top of the assembled embodiment of the zero caulk standoff of FIG. 11A;

FIG. 11D is a perspective view from the bottom of the assembled embodiment of the zero caulk standoff of FIG. 11A;

FIG. 11E is a side elevation view of the assembled embodiment of the zero caulk standoff of FIG. 11A;

FIG. 11F is a cross-sectional view from the side of an assembled embodiment of the zero caulk standoff of FIG. 11A.

DETAILED DESCRIPTION OF THE INVENTION

Figure 1D:
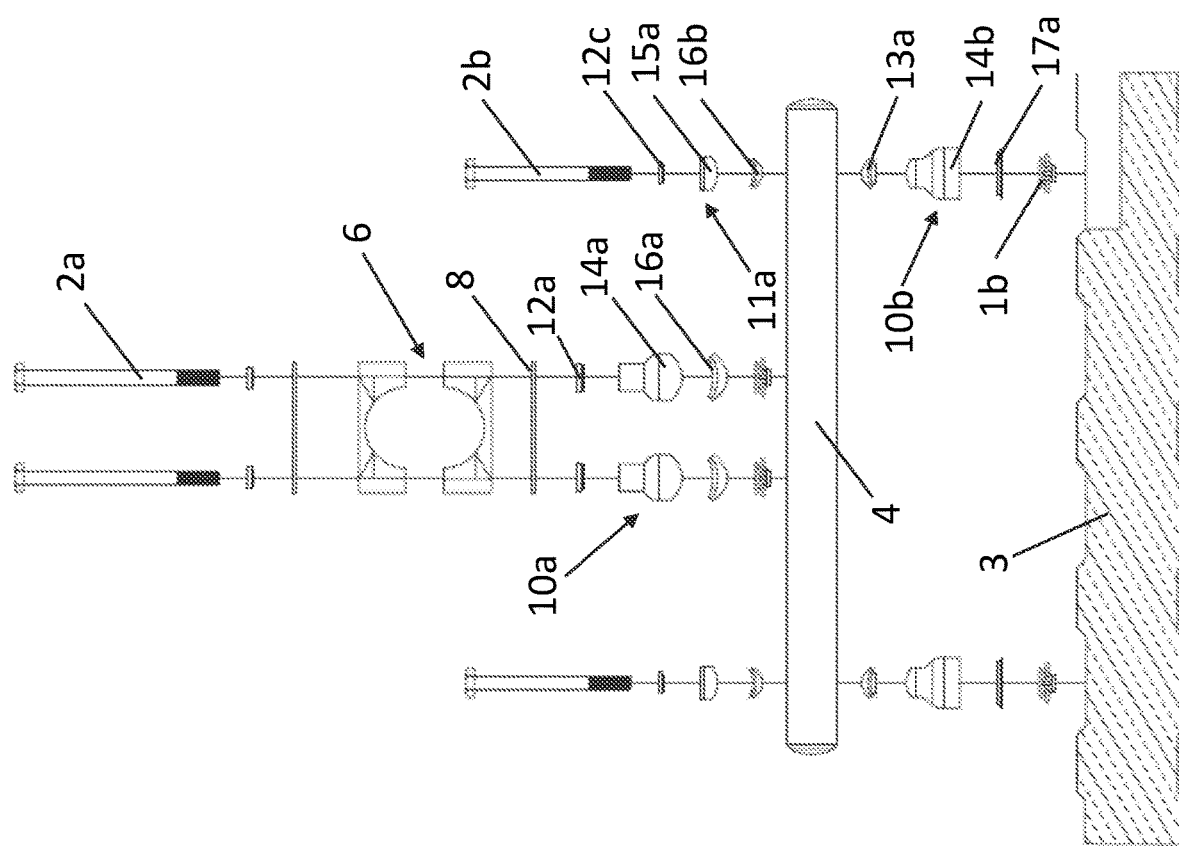
FIG. 1D is an exploded view of the components of the embodiments of the zero caulk standoff of FIG. 1A with a pipe, IMP, block-style pipe hanger and mounting hardware.

As shown in FIG. 1A, embodiments of the zero caulk standoff 10 may be formed in various shapes and sizes to accommodate the sealing of mounting hardware on either flat or curved surfaces. Also, within the scope of the present invention embodiments of zero caulk washers 11 may be formed in various shapes and sizes to accommodate the sealing of mounting hardware on either flat or curved surfaces. As illustrated in FIG. 1A, a jack nut 1a secures a bolt 2a to mount a block-style pipe hanger 6 on to a pipe 4. The embodiment of the zero caulk standoff 10a surrounds a portion of the bolt 2a and seals an upper opening in the pipe 4. Also shown is a second jack nut 1b within an insulated metal panel (IMP) 3 that secures a bolt 2b that is inserted through the pipe 4. The pipe 4 is aligned on the embodiment of the zero caulk standoff 10b with the zero caulk standoff 10b surrounding a portion of the second bolt 2b and sealing the lower opening in the pipe 4. The zero caulk standoff 10b also seals the jack nut 1a that is securing the bolt 2b to the IMP 3. The upper portion of the bolt 2b and the upper opening in the pipe 4 through which the bolt 2b is inserted are sealed by the embodiment of the zero caulk washer 11a. FIG. 1B is a cross-section of a portion of the pipe 4 showing the jack nut 1a and the bolt 2a that secures the block-style hanger 6 to the pipe 4. As shown, the embodiment of the zero caulk standoff 10a surrounds an upper portion of the bolt 2a, the opening in the pipe 4, and the upper portion of the jack nut 1a to seal and prevent dirt, liquid, bacteria, or other contaminants from forming on the uneven surfaces of the bolt 2a and jack nut 1a. As shown in FIG. 1C, the zero caulk standoff 10 shown in this embodiment 10a comprises a zero caulk spacer 14a made of stainless steel or rigid plastic and a ridged seal 16a of an elastomeric material that has a curvature and is configured to seal to curved surfaces. The bottom of the zero caulk spacer 14a and curved ridged seal 16a have a mating curvature and channel and ridge or alternatively a ridge and channel respectfully that interlock to surround the zero caulk standoff 10a around a jack nut 1, bolt 2, or other mounting hardware and to seal to piping, tubing, or other curved surface.

Figure 1E:
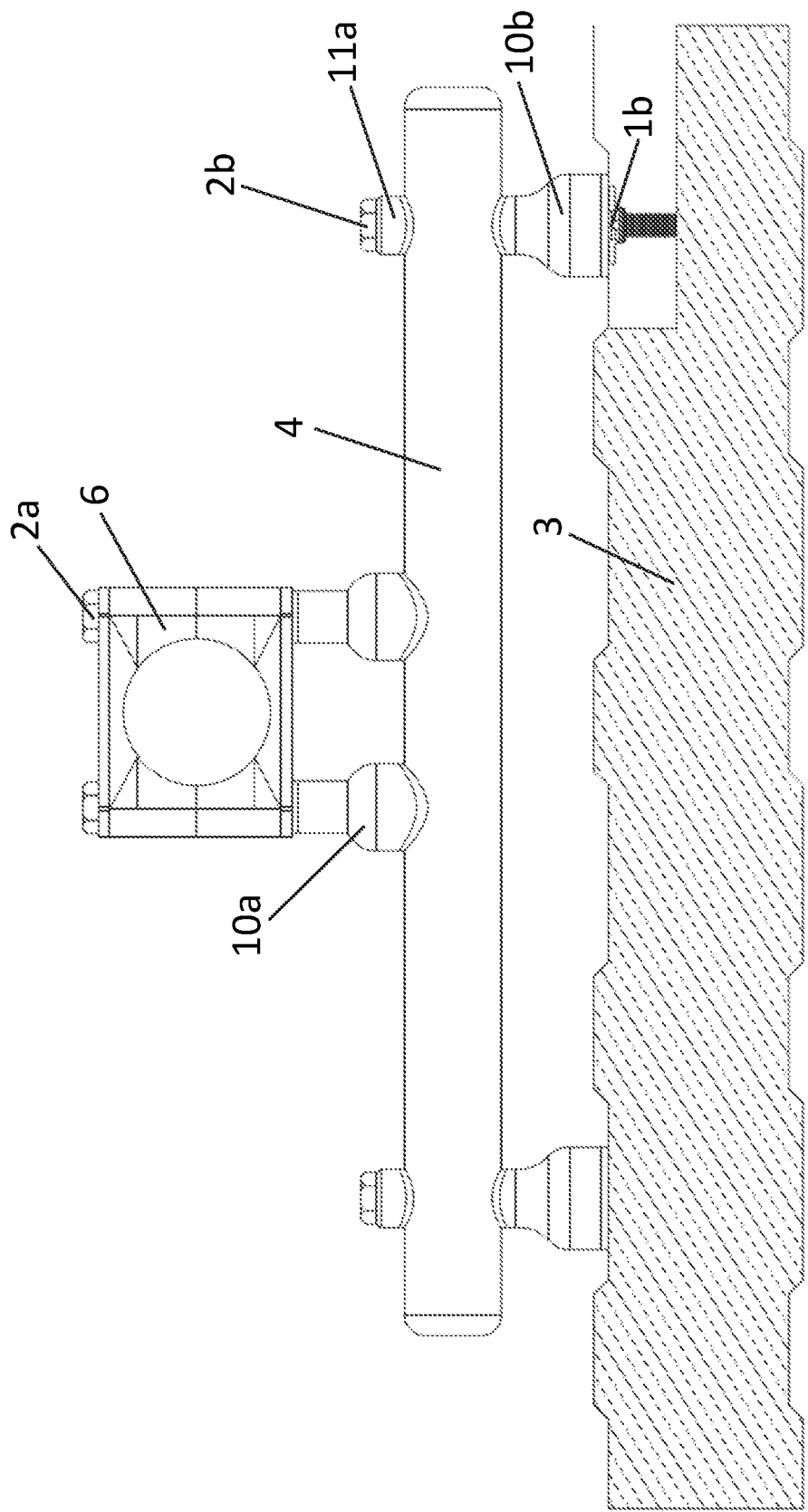
FIG. 1E is an assembled view of the components of the embodiments of the zero caulk standoff shown in FIG. 1D with a pipe, IMP, block-style pipe hanger and mounting hardware.

As shown in an exploded assembly view in FIG. 1D and in an assembled view in FIG. 1E, in addition to the zero caulk spacer 14a and curved ridged seal 16a, the zero caulk standoff 10a also comprises a gasket 12a that has no curvature. The gasket 12a snaps into the zero caulk spacer 14a to seal the zero caulk standoff 10a to flat surfaces such as the lower bracket 8 of the block-style pipe hanger 6. In the embodiment of the zero caulk standoff 10b, a zero caulk curved gasket 13a snaps into the zero caulk spacer 14b at the top of the zero caulk standoff 10b to seal the opening in the pipe 4 and a flat ridged seal 17a interlocks with the zero caulk spacer 14b at the bottom of the zero caulk standoff 10b to surround and seal a portion of the bolt 2b and the jack nut 1b to the flat surface of the IMP 3 as shown in the cutaway portion in FIG. 1E. The upper portion of the bolt 2b and top opening in the pipe 4 for the insertion of the bolt 2b are surrounded and sealed with an embodiment of a zero caulk washer 11a as a further embodiment of the zero caulk standoff 10 that comprises a gasket 12c, a zero caulk washer cap 15a, and a curved ridged seal 16b. The embodiments of the zero caulk standoffs 10a and 10b and the zero caulk washer 11a as assembled in FIG. 1E show the pipe 4 anchored to the IMP 3 and supported on the embodiment of the zero caulk standoff 10b. The block-style pipe hanger 6 is secured to the pipe 4 and supported by the embodiment of the zero caulk standoff 10a. The openings in the pipe 4 and irregular surfaces of the jack nuts 1 and bolts 2 are sealed by the embodiments of the zero caulk standoff 10a, 10b and the zero caulk washer 11a.

The embodiment of the zero caulk standoff 10a is shown in an exploded view from a top perspective in FIG. 2A. The zero caulk standoff 10a comprises the zero caulk gasket 12a, the zero caulk spacer 14a and the zero caulk curved ridged seal 16a. In this embodiment, the zero caulk spacer 14a is formed with a body 18 that is hemispherical in shape, a neck 20 that is cylindrical in shape, and a base 22 that has a curvature that mates with the curvature of the zero caulk curved ridged seal 16a. The neck 20 has a cylindrical interior surface 19 that may be formed with a protrusion 24 or threads to secure the zero caulk gasket 12a.

The zero caulk curved ridged seal 16a is formed with an extended circular ridge 25 that follows the curvature of the surface of the zero caulk curved ridged seal 16a. The extended circular ridge 25 has an interior sidewall 26 extending from an upper interior sealing surface 28 along an upper surface 30 to an exterior sidewall 34 extending up from an upper exterior sealing surface 36 that extends to the outer edge 32 of the zero caulk curved ridged seal 16a. The interior edge 38 and curved bottom surface 40 of the zero caulk curved ridged seal 16a are shown in 2B. The zero caulk curved ridged seal 16a, the ridge 25 and the other sealing surfaces may be of any suitable dimension to appropriately surround and seal all types of mounting hardware and have sufficient surface area to seal around piping, tubing, or other curved surfaces. In this embodiment, the ridge 25 and sealing surfaces are dimensionally formed to have the zero caulk curved ridged seal 16a mate with the zero caulk spacer 14a as shown in a bottom view in FIG. 2B.

The base 22 of the zero caulk spacer 14a is formed with a curved lower surface 21 with a cylindrical interior surface 42 that forms an opening for the insertion of mounting hardware through the zero caulk spacer 14*a*. An inner sealing surface 44 is at the bottom of an interior sidewall 46 forming the cylindrical interior. A channel 48 is formed between the interior sidewall 46 and an outer sidewall 50. The outer sidewall 50 has an outer sealing surface 52. The upper interior surface 54 of the hemispherical body 18 has an opening for a bolt 2 or other mounting hardware to be inserted through the zero caulk spacer 14*a*.

The channel 48 follows the curvature of the curved lower surface 21 that matches the curvature of the ridge 25 of the zero caulk curved ridged seal 16*a*. The channel 48 has slightly larger dimensions than the ridge 25 to have the ridge 25 and channel 48 form a frictional fit between the elastomeric sealing surfaces of the zero caulk curved ridged seal 16*a* and the interior sidewall 46 and outer sidewall 50 of the stainless steel or rigid plastic zero caulk spacer 14*a*. In embodiments of the zero caulk standoff 10, the curvatures of the zero caulk spacer 14 and zero caulk curved ridged seal 16 are of the same radius which may be formed in various dimensions to match with and seal to different diameters of piping and tubing. The mating and interlocking of the zero caulk curved ridge seal 16*a* and zero caulk spacer 14*a* seal along the surface of piping, tubing, or other curved surfaces. Additionally, as a bolt 2 or other type of mounting hardware is tightened, the elastomeric material of the zero caulk curved ridged seal 16*a* compresses in one direction and expands perpendicularly to the compression filling the channel 48 and sealing to the surfaces of the zero caulk spacer 14*a* to form a watertight seal. The mounting hardware is sealed within the cavity formed by the cylindrical shape of the interior surface 42.

In some embodiments, the top of the zero caulk spacer 14*a* is sealed using a zero caulk gasket 12*a*. Embodiments of the zero caulk gasket 12*a* are formed with a flat upper surface 56 that extends to an edge 58 and a lower surface 60. The lower surface 60 has a cylindrical wall 62 that extends from an opening formed for the mounting hardware to be inserted through the zero caulk gasket 12*a*. The cylindrical wall 62 has an exterior surface 64 that in some embodiments has a groove 66 that mates with the protrusion 24 formed in the zero caulk spacer 14*a* to snap in and secure the zero caulk gasket 12*a* to the zero caulk spacer 14*a*. The zero caulk gasket 12*a* is of elastomeric material that seals to the upper surface 68 of the zero caulk spacer 14*a* by compression as a bolt 2 or other mounting hardware is tightened. The upper surface 56 of the zero caulk gasket 12*a* is configured to seal to flat surfaces of pipe hangers or brackets or ceilings, floors, walls, IMP, or other flat attachment surfaces.

Figure 2F:
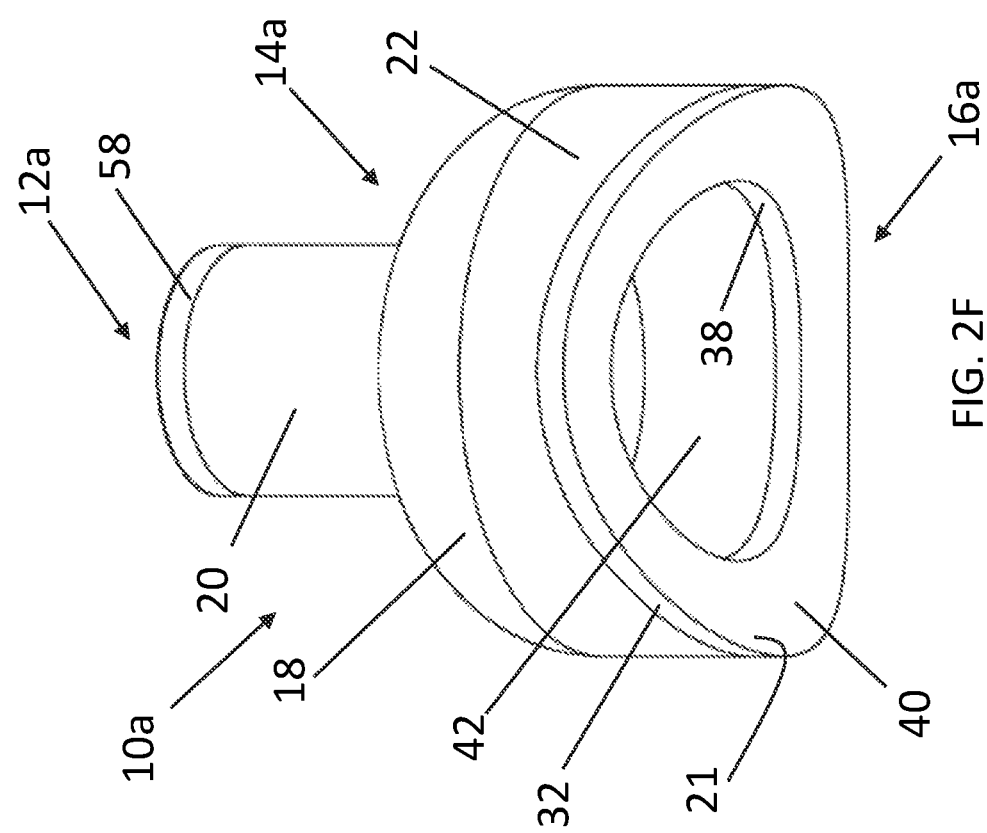
FIG. 2F is a perspective view from the bottom of the assembled embodiment of the zero caulk standoff of FIG. 2C.
Figure 2E:
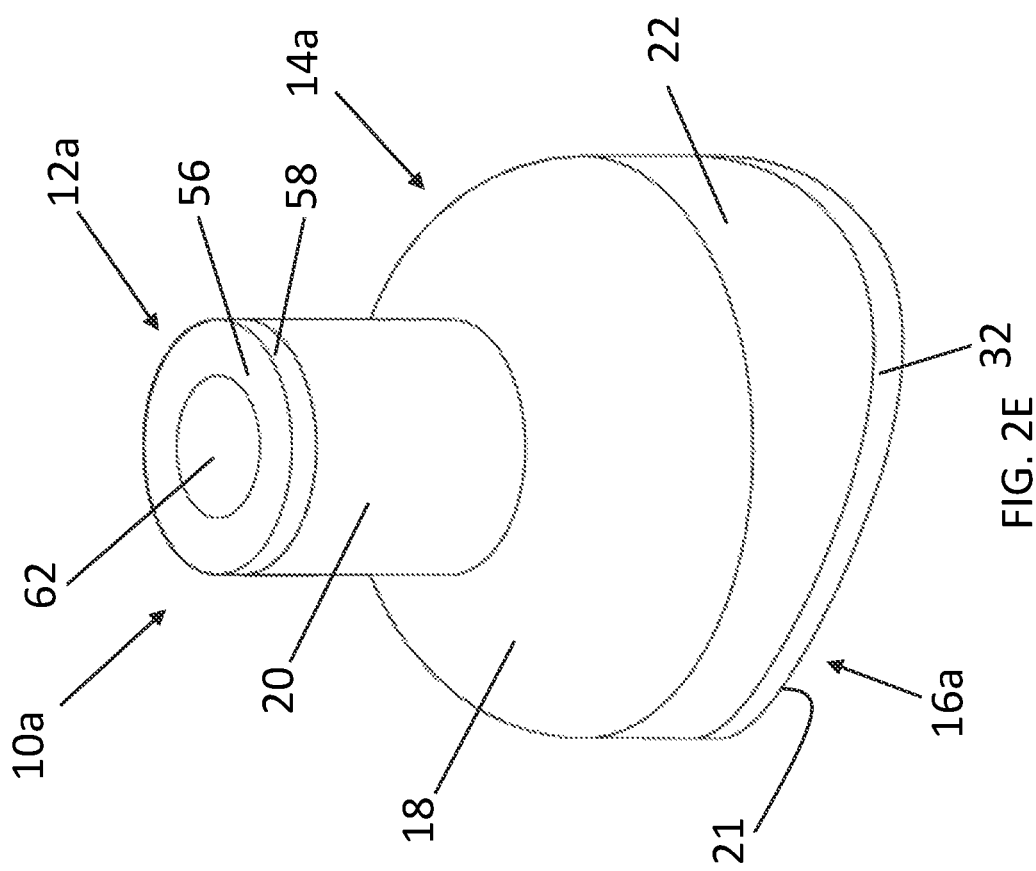
FIG. 2E is a perspective view from the top of the assembled embodiment of the zero caulk standoff of FIG. 2C.

When assembled as shown in an elevation view in FIG. 2C, the elastomeric zero caulk gasket 12*a* and zero caulk curved ridged seal 16*a* seal the surfaces of the stainless steel or rigid plastic zero caulk spacer 14*a*. The cross-sectional view in FIG. 2D shows the interlocking of the ridge 25 of the zero caulk curved ridged seal 16*a* and the channel 48 of the zero caulk spacer 14*a*. The snap fit of the zero caulk gasket 12*a* and the zero caulk spacer 14*a* using the protrusion 24 of the zero caulk spacer 14*a* and the groove 66 of the zero caulk gasket 12*a* is also shown. The cross-section of the sidewall 70 of the zero caulk spacer 14*a* is also shown. The assembled embodiment of zero caulk standoff 10*a* is shown in a perspective view from the top in FIG. 2E and in a perspective view from the bottom in FIG. 2F.

The embodiment of the zero caulk standoff 10*b* is shown in an exploded view from a top perspective in FIG. 3A. In this embodiment, the zero caulk spacer 14*b* is formed with a sloping neck 20, a body 18 that is hemispherical in shape, and a base 22 that has a flat bottom surface 27. A perspective view from the bottom is shown in FIG. 3B. A zero caulk flat ridged seal 17*a* mates with the flat surface of the zero caulk spacer 14*b* with the ridge 25 of the zero caulk flat ridged seal 17*a* interlocking with the channel 49 of the zero caulk spacer 14*b* to form a watertight seal. Also, in this embodiment, the zero caulk spacer 14*b* is formed with a curved upper surface 69. A zero caulk curved gasket 13*a* having a curved surface 57 that matches and is configured to mate with the curved upper surface 69 of the zero caulk spacer 14*b* is secured to the zero caulk spacer 14*b* by snapping the protrusion 24 along the interior surface 19 of the neck 20 of the zero caulk spacer 14*b* into the groove 66 of the zero caulk curved gasket 13*a*.

The zero caulk flat ridged seal 17*a* is formed with an opening and the ridge 25 has an interior sidewall 26 extending from the flat upper interior sealing surface 29 along an upper surface 30 to an exterior sidewall 34 extending up from the flat upper exterior sealing surface 37 that extends to the outer edge 32 of the zero caulk flat seal 17*a*. The interior edge 38 and flat bottom surface 40 are shown in FIG. 3B. The zero caulk flat ridged seal 17*a*, the ridge 25 and the other sealing surfaces may be of any suitable dimension to appropriately surround and seal mounting hardware and have sufficient surface area to seal to flat surfaces. In this embodiment, the ridge 25 and sealing surfaces are dimensionally formed to have the zero caulk flat ridged seal 17*a* mate with the channel 49 of the of the flat bottom of zero caulk spacer 14*b* as shown in a bottom perspective view in FIG. 3B. The zero caulk spacer 14*b* is formed with a cylindrical base 22 that has an interior surface 42 that forms a rim 45 at the bottom of an interior sidewall 47 to form the channel 49 between the interior sidewall 47 and an outer sidewall 51. A lower sealing surface 53 is at the bottom of the outer wall 51 of the flat bottom surface 27 of the zero caulk spacer 14*b*. The channel 49 is of a slightly larger dimension than the ridge 25 of the zero caulk flat ridged seal 17*a* to form a frictional fit between the elastomeric sealing surfaces of the zero caulk flat ridged seal 17*a* and the interior sidewall 47 and outer sidewall 51 of the stainless steel zero caulk spacer 14*b*. Additionally, as a bolt 2 of the mounting hardware is tightened, the elastomeric material of the zero caulk flat ridged seal 17*a* compresses in one direction and expands perpendicularly to the compression filling the channel 49 and sealing to the surfaces of the zero caulk spacer 14*b* forming a watertight seal. The mounting hardware is sealed within the cavity formed by the interior surface 42. An opening is formed for a bolt 2 or other attachment fixture to be inserted through the zero caulk spacer 14*b*.

In this embodiment, the top of the zero caulk spacer 14*b* is sealed using a zero caulk curved gasket 13*a*. The zero caulk curved gasket 13*a* is formed with an upper surface 57 having a curvature and a curved edge 59 with a lower surface 61. A cylindrical wall 62 forms an opening for the mounting hardware. The cylindrical wall 62 extends from the curved lower surface 61 and has an exterior surface 64 that in some embodiments has a groove 66 that mates with the protrusion 24 formed in the zero caulk spacer 14*b* to secure the zero caulk curved gasket 13*a* to the zero caulk spacer 14*b*. The zero caulk curved gasket 13*a* is of an elastomeric material and is sealed to the curved upper surface 69 of the zero caulk spacer 14*b* by compression as a bolt 2 or other mounting hardware is tightened.

Figure 3F:
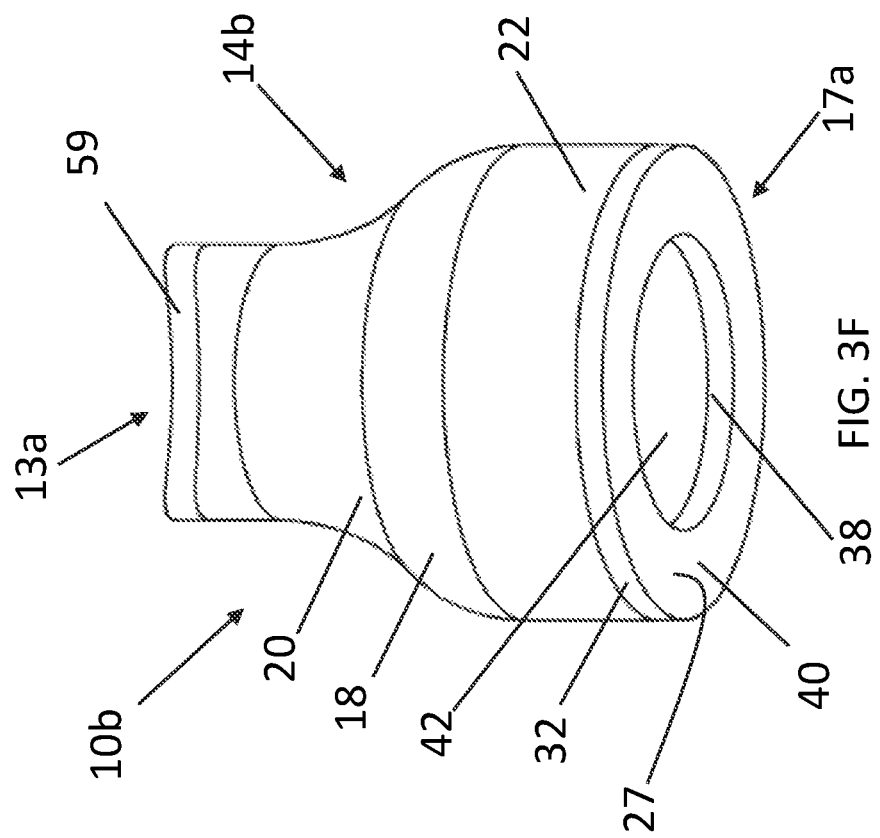
FIG. 3F is a perspective view from the bottom of the assembled embodiment of the zero caulk standoff of FIG. 3C.
Figure 3E:
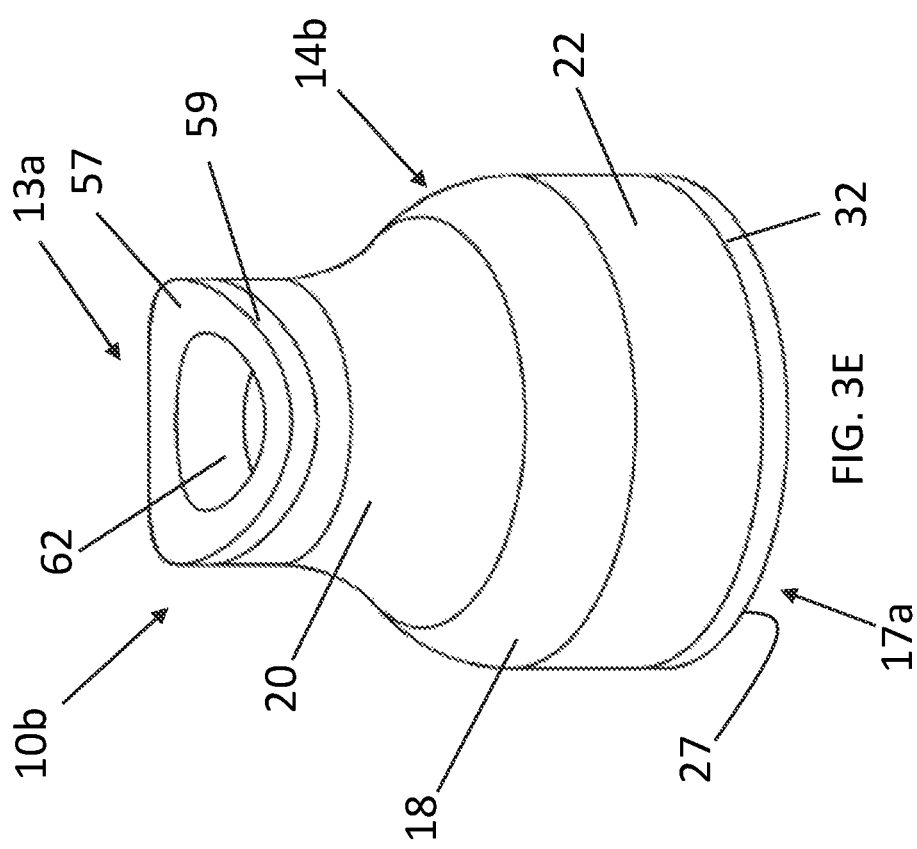
FIG. 3E is a perspective view from the top of the assembled embodiment of the zero caulk standoff of FIG. 3C.

When assembled as shown in an elevation view in FIG. 3C, the elastomeric zero caulk curved gasket 13*a* and zero caulk flat ridged seal 17*a* seal the surfaces of the stainless steel zero caulk spacer 14*b*. The cross-sectional view in FIG. 3D shows the interlocking of the ridge 25 of the zero caulk flat ridged seal 17a and the flat channel 49 of the zero caulk spacer 14b and the snap fit of the zero caulk curved gasket 13a and the zero caulk spacer 14b using the protrusion 24 of the zero caulk spacer 14b and the groove 66 of the zero caulk curved gasket 13a. The cross-section of the sidewall 71 showing the curvature of the neck 20 of the zero caulk spacer 14b is also shown. The assembled embodiment of zero caulk standoff 10b is shown in a perspective view from the top in FIG. 3E and in a perspective view from the bottom in FIG. 3F.

A further embodiment of the zero caulk washer 11b is shown in an exploded view from a top perspective in FIG. 4A. In this embodiment, the zero caulk washer 11b has a zero caulk washer cap 15a and a zero caulk curved ridged seal 16b that interlocks with the zero caulk washer cap 15a. In this embodiment, the zero caulk washer cap 15a is formed with a rounded edge 72 and an upper surface 74 that is flat for an elastomeric gasket 12c as shown in FIG. 1D. The zero caulk washer cap 15a has a cylindrical body 76 with a bottom surface 78 that has a curvature that mates with the curvature of the zero caulk curved ridged seal 16b. The zero caulk washer cap 15a has an opening for a bolt 2 or other mounting hardware to be inserted through.

The zero caulk curved ridged seal 16b is formed with an opening and a ridge 25 that has an interior sidewall 26 extending from an upper interior sealing surface 28 along an upper surface 30 to an exterior sidewall 34 extending up from an upper exterior sealing surface 36 that extends to the outer edge 32 of the zero caulk curved ridged seal 16b. The interior edge 38 and bottom surface 40 are shown in 4B. The zero caulk curved ridged seal 16b, the ridge 25 and the other sealing surfaces may be of any suitable dimension to appropriately surround and seal mounting hardware and have sufficient surface area to seal to the curvature of the outer surfaces of piping, tubing or other curved surfaces. In this embodiment, the ridge 25 and sealing surfaces are dimensionally formed to have the zero caulk curved ridged seal 16b mate with the zero caulk washer 11b as shown in a bottom view in FIG. 4B. The curved bottom surface 78 of the cylindrical body 76 of the zero caulk washer 11b has an interior surface 80 that forms a rim 82 at the bottom and an interior sidewall 84. A channel 86 is formed between the interior sidewall 84 and an outer sidewall 88. A lower sealing surface 90 is formed at the base of the outer sidewall 88. The channel 86 is of a slightly larger dimension than the ridge 25 with a matching curvature to the zero caulk curved ridged seal 16b forming a frictional fit between the elastomeric sealing surfaces of the zero caulk curved ridged seal 16b and the interior sidewall 82 and the outer sidewall 88 of the stainless steel zero caulk washer 11b. Additionally, as a bolt 2 of the mounting hardware is tightened, the elastomeric material of the zero caulk curved ridged seal 16b compresses in one direction and expands perpendicularly to the compression filling the channel 86 and sealing to the surfaces of the zero caulk washer 11b forming a watertight seal. The mounting hardware such as a bolt 2 is sealed within the area formed by the interior cylindrical surface 80.

Figure 4D:
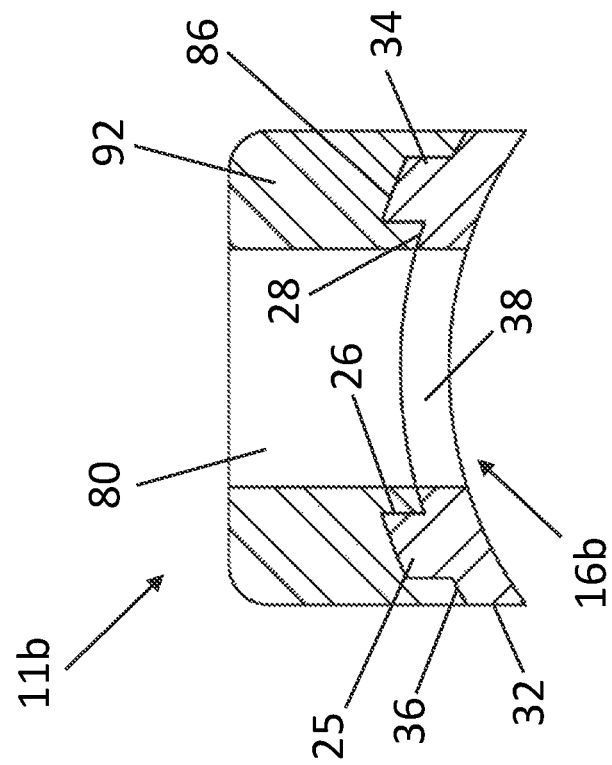
FIG. 4D is a cross-sectional view of the assembled embodiment of the zero caulk standoff of FIG. 4C.
Figure 4C:
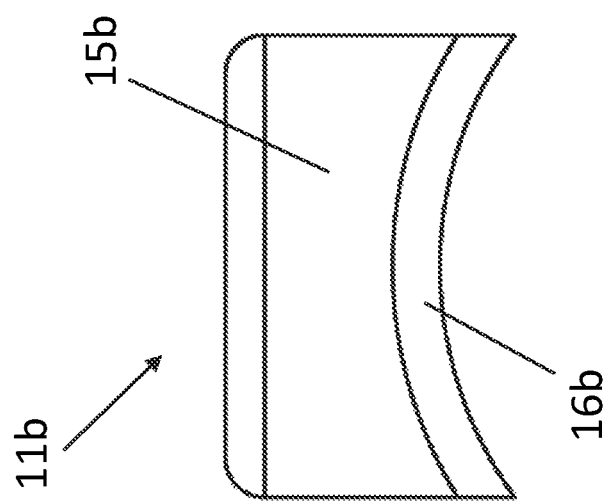
FIG. 4C is an elevation view of an assembled embodiment of the zero caulk standoff of FIG. 4A.
Figure 4F:
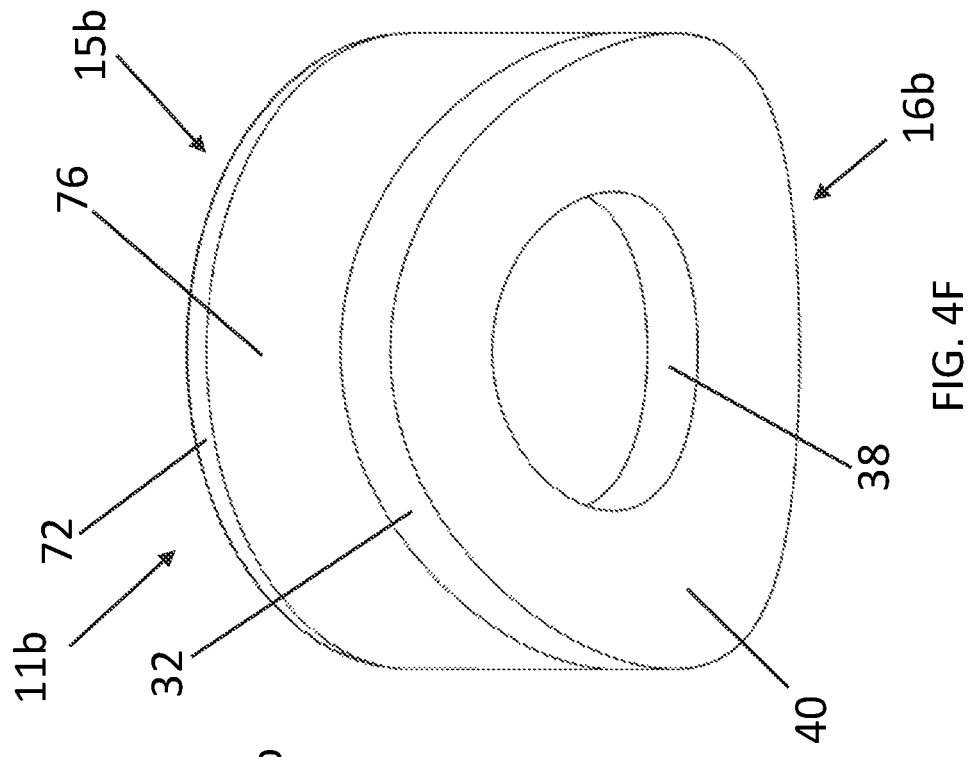
FIG. 4F is a perspective view from the bottom of the assembled embodiment of the zero caulk standoff of FIG. 4C.
Figure 4E:
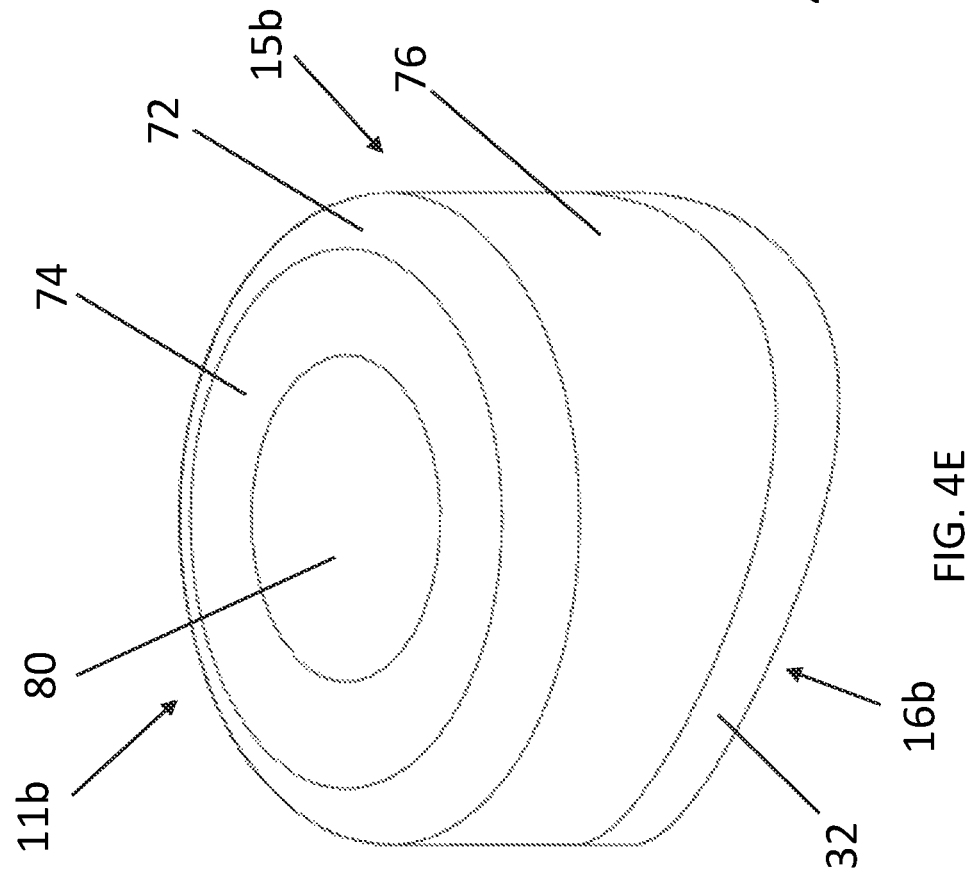
FIG. 4E is a perspective view from the top of the assembled embodiment of the zero caulk standoff of FIG. 4C.

When assembled as shown in an elevation view in FIG. 4C, the zero caulk curved ridged seal 16b seals the curved bottom surface of the stainless steel zero caulk washer 11b. The cross-sectional view in FIG. 4D shows the interlocking of the ridge 25 of the zero caulk curved ridged seal 16b and the channel 86 of the zero caulk washer 11b. The cross-section of the sidewall 92 of the zero caulk washer 11b is also shown. The assembled embodiment of zero caulk washer 11b is shown in a perspective view from the top in FIG. 4E and in a perspective view from the bottom in FIG. 4F.

Figure 5:
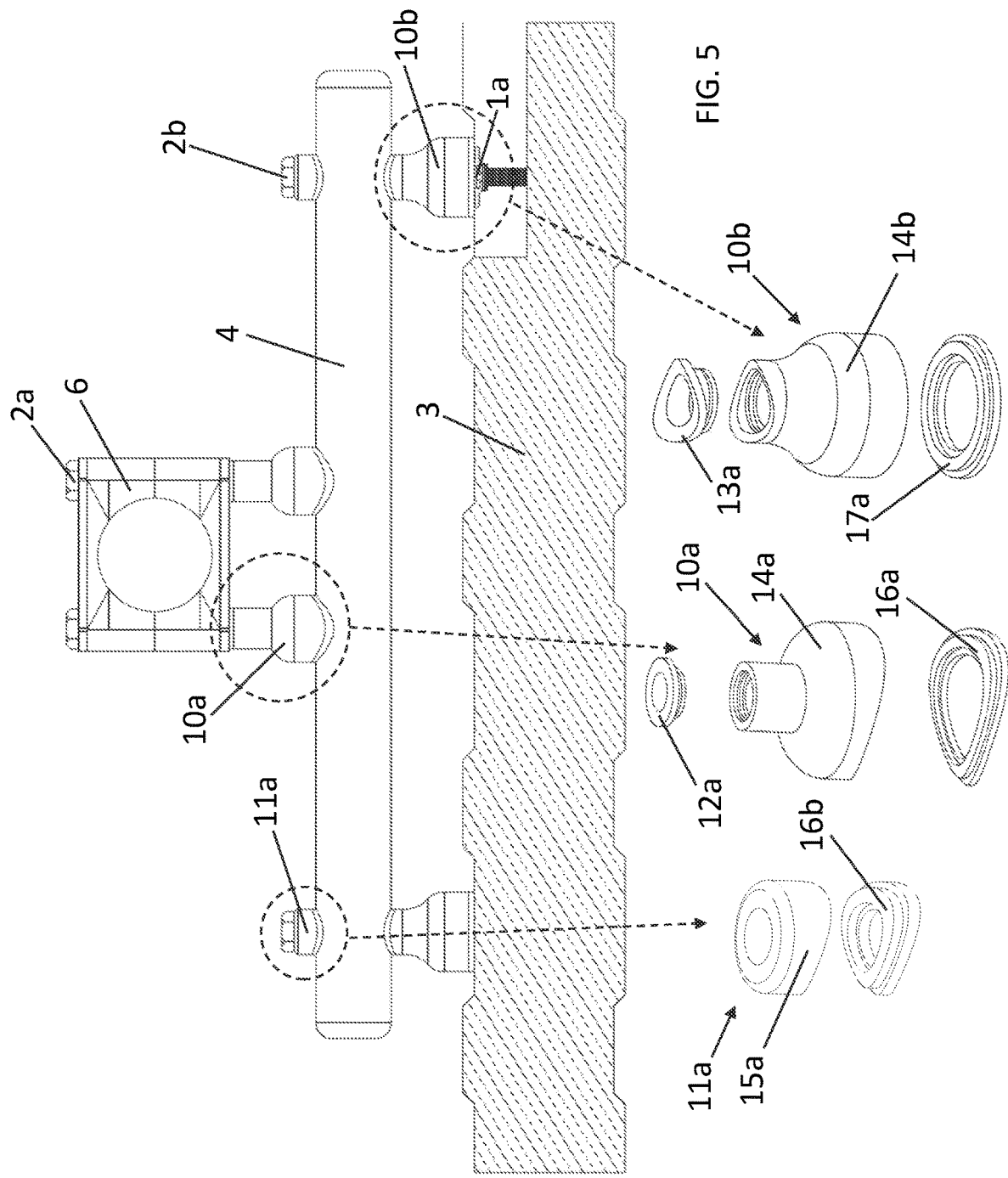
FIG. 5 is an assembled view of the embodiments of the zero caulk standoff with a pipe, IMP, block-style pipe hanger and mounting hardware as shown in FIG. 1E with the exploded views of the components of the embodiments of the zero caulk standoff shown in FIGS. 2A-4F.

In FIG. 5, exploded views of each of these embodiments of the zero caulk standoffs 10a and 10b, and zero caulk washer 11b are shown with the assembled views with mounting hardware and piping in the same the piping system configuration as FIG. 1D. A block-style hanger 6 is supported on the embodiment of the zero caulk standoff 10a and is mounted to the pipe 4. The zero caulk standoff 10a seals bolt 2a and the opening in the pipe 4 for bolt 2a. The pipe 4 is supported on the zero caulk standoff 10b and the pipe 4 is anchored to the IMP 3 using bolt 2b. The bolt 2b and opening in the pipe 4 for bolt 2b is sealed with the zero caulk washer 11b. As noted above the cutaway shows the embodiment of the zero caulk standoff 10b sealing the bottom opening in the pipe 4, the lower portion of the bolt 2a, and the upper portion of the jack nut 1a. Importantly, the components of each embodiment are configured to be mixed and matched to have the appropriate combinations of curvature on one or both of the top and bottom of the standoff and to have the features and dimensions to suit the installation requirements of the piping system, for example, the zero caulk curved ridged seal 16a may be used with the zero caulk washer cap 15a if the dimensions and curvature of each are matched and the components together meet the sanitary environment conditions and requirements.

Figure 7A:
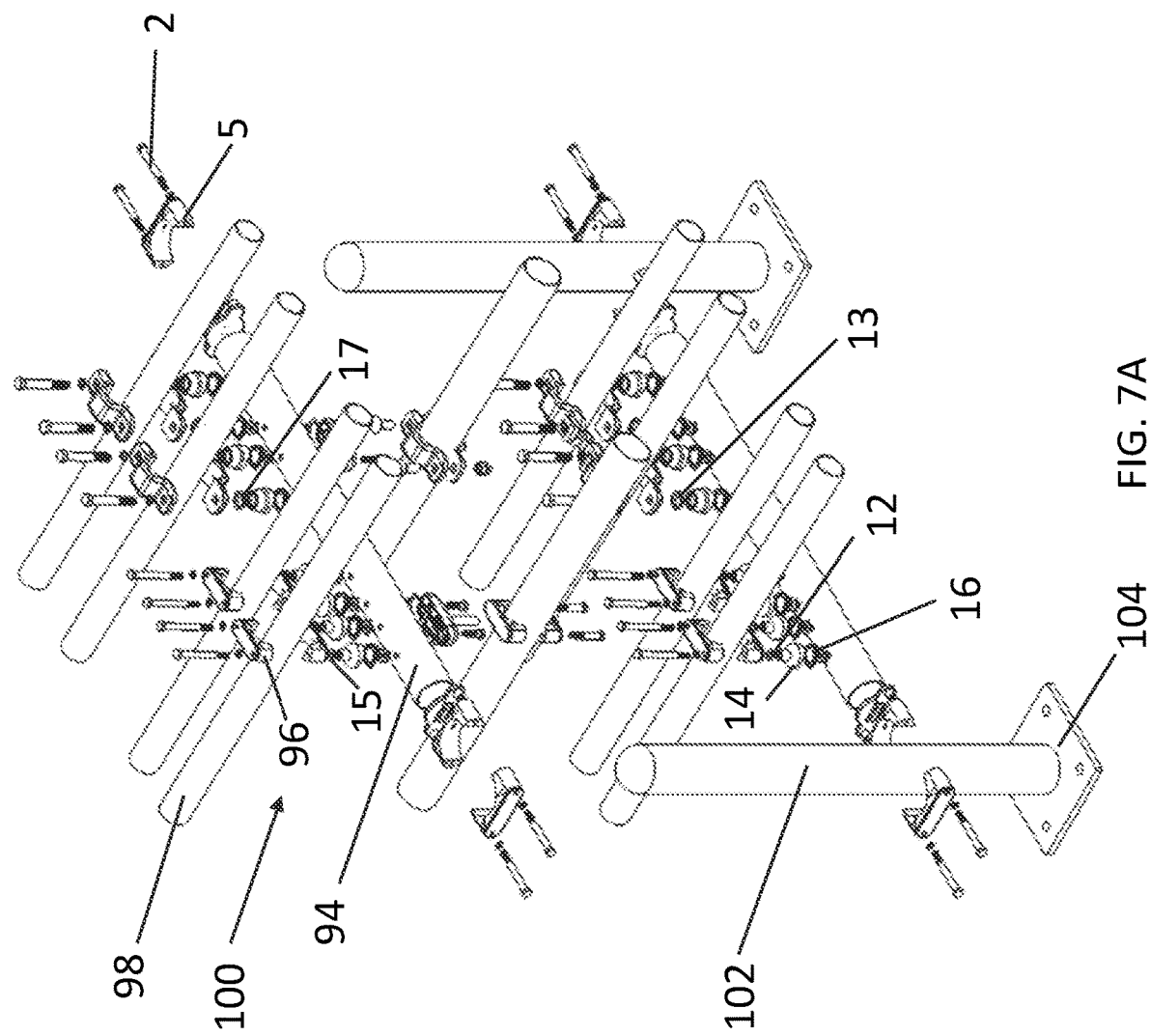
FIG. 7A is an exploded perspective view of an embodiment of a rack system with the components of embodiments the zero caulk standoff of the present invention and various pipe brackets, block-style pipe hangers, mounting brackets and mounting hardware.
Figure 7B:
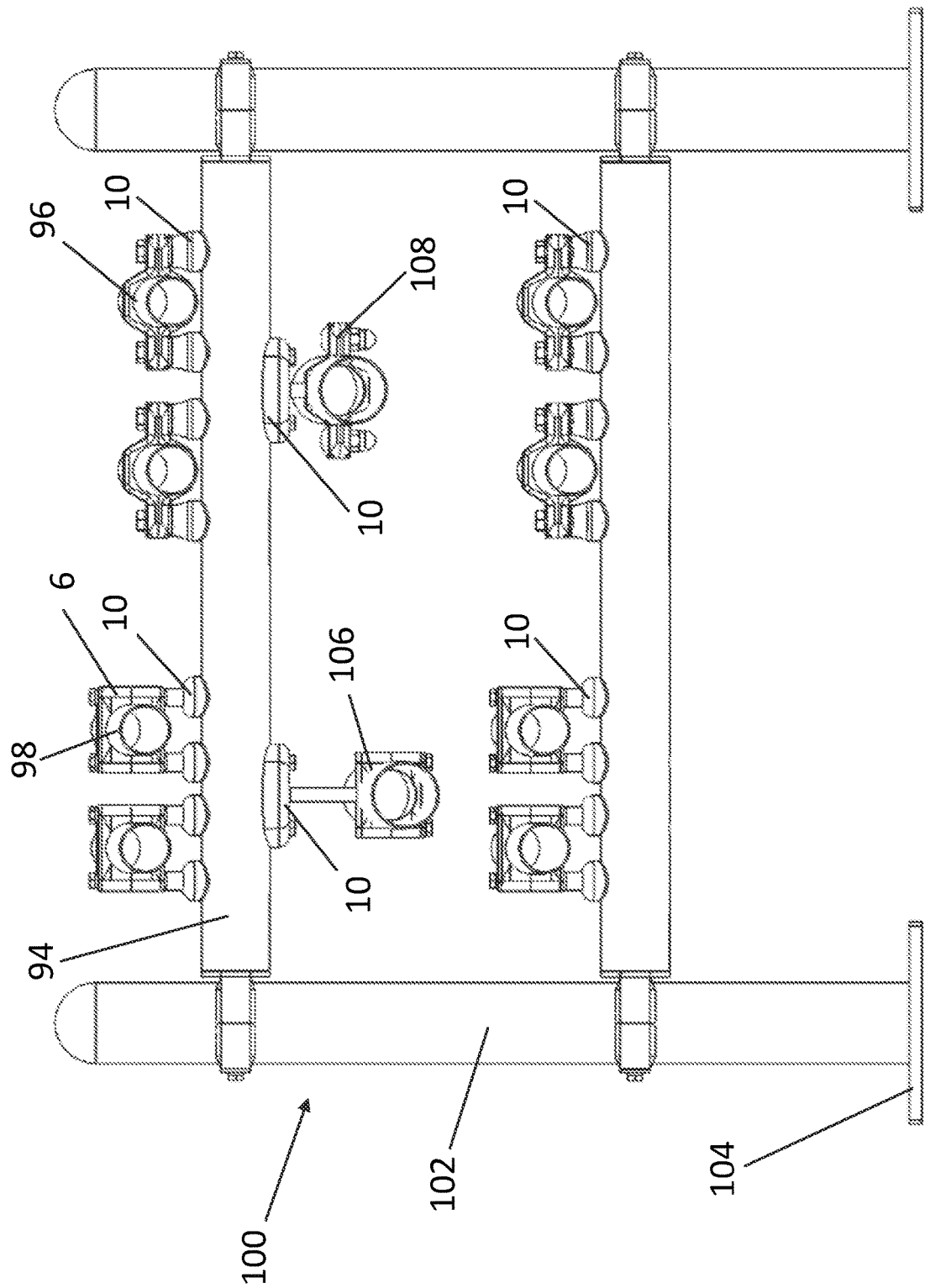
FIG. 7B is an assembled elevation view of an embodiment of the rack system of FIG. 7A with the assembled embodiments of the zero caulk standoff of the present invention and various pipe brackets, block-style pipe hangers, mounting brackets and mounting hardware.

A unique feature of the zero caulk standoff 10 is the ability to drill a hole at a specified angle and use only the zero caulk standoff 10 to align a pipe at that angle to for example have the pipe be aligned at a required drainage angle. As shown in FIG. 6, in this example, a mounting pipe 94 is affixed to a mounting bracket 5. A hole is drilled through the mounting pipe 94 at a proper drainage angle of 1° to 2° from the vertical axis $A_y$. A pipe bracket 96 is placed around a pipe 98 that will be aligned at the proper drainage angle. A bolt 2 is inserted through the pipe bracket 96 and the bolt 2 is inserted through the zero caulk standoff 10 and into the hole that is drilled in the mounting pipe 94. A jack nut 1 secures the bolt 2 with the drainage pipe 98, pipe bracket 96 and zero caulk standoff 10 and because of the curvature of the zero caulk standoff 10 the drainage pipe is supported at the proper drainage angle without out a requirement for additional hardware or caulking to seal the drainage pipe and mounting hardware. The curvature of the zero caulk standoff maintains the pipe 98 at the proper angle as the mounting hardware is attached to other piping, IMP, a rack, or another type of flat or curved surface. Piping systems can be constructed having various configurations considerably less time than using mounting systems of the prior art. A rack system 100 as shown in FIG. 7A can align a mounting pipe 94 that has been predrilled with holes at the proper drainage angle and by using the zero caulk standoffs 10 each pipe bracket 96 aligns the drainage pipes 98 at the proper drainage angle as the zero caulk standoffs 10 and pipe brackets 96 are installed as shown in FIG. 7B. The rack system 100 can be constructed with legs 102 and base supports 104 to move and position the rack system 100 for proper placement and alignment of the pipes 98. Various mounting systems can be installed to the rack system 100 such as the block style 6, pedestal brackets 106 and cradle brackets 108 to accommodate different diameters of pipe and specific requirements of the workflow of the industrial facility. The base support can then be affixed to a floor, wall, ceiling, fixture, IMP, or other surface.

Piping can further be aligned in different directions using other embodiments of the zero caulk standoff 10. As shown in FIG. 8A, by forming a tubular spacer 110 having a curvature 121 at one end in one direction and a curvature 123 at the other end in a different direction the zero caulk standoff 10 can direct and support piping in two different directions. A zero caulk ridged seal 16 mates with and interlocks with a channel 112 formed on each end of the tubular spacer 110. As shown in FIG. 8B, a cylindrical interior surface 114 extends to each end to form an opening for the insertion of mounting hardware through the zero caulk spacer 110. An interior sidewall 116 with a lower sealing surface 118 extends from the interior surface 114 and an exterior sidewall 120 extends from the outer surface 122 of the tubular spacer 110. The channel 112 is formed between the interior sidewall 116 and the outer sidewall 120. In this embodiment each end of the tubular spacer is similar in dimensions and the same type of zero caulk ridged seal 16 is used on each end of the zero caulk tubular spacer 110. An assembled perspective view of the zero caulk standoff 10 with the tubular spacer 110 from the top is shown in FIG. 8C and from the bottom in FIG. 8D showing how a pipe would be attached on one end and be directed in a first direction and be attached on the other end and be directed in a different direction. As shown as an example in FIG. 9, for the attachment a jack nut 1 could be installed in each pipe and a bolt 2 could be inserted through the jack nut in the first pipe 4a, through the zero caulk standoff 10, and through to the jack nut 1 in the second pipe 4b. As the bolt 2 is tightened the elastomeric material of each of the zero caulk ridged seals 16 are compressed filling the channels 112 and sealing to the surfaces of the zero caulk tubular spacer 110 to form a watertight seal. Each pipe 4a and 4b is securely attached and is directed by the zero caulk standoff 10 in different directions. A zero caulk washer 11 seals around a portion of the bolt 2 and the opening in pipe 4a. In other embodiments, a zero caulk standoff 10 may be formed with a zero caulk spacer 14 or zero caulk washer 11 having different diameters, sizes and shapes at the neck and base and different curvatures at the upper and lower surface to direct piping in different directions within the piping system specified by the requirements of the industrial facility.

Figure 10A:
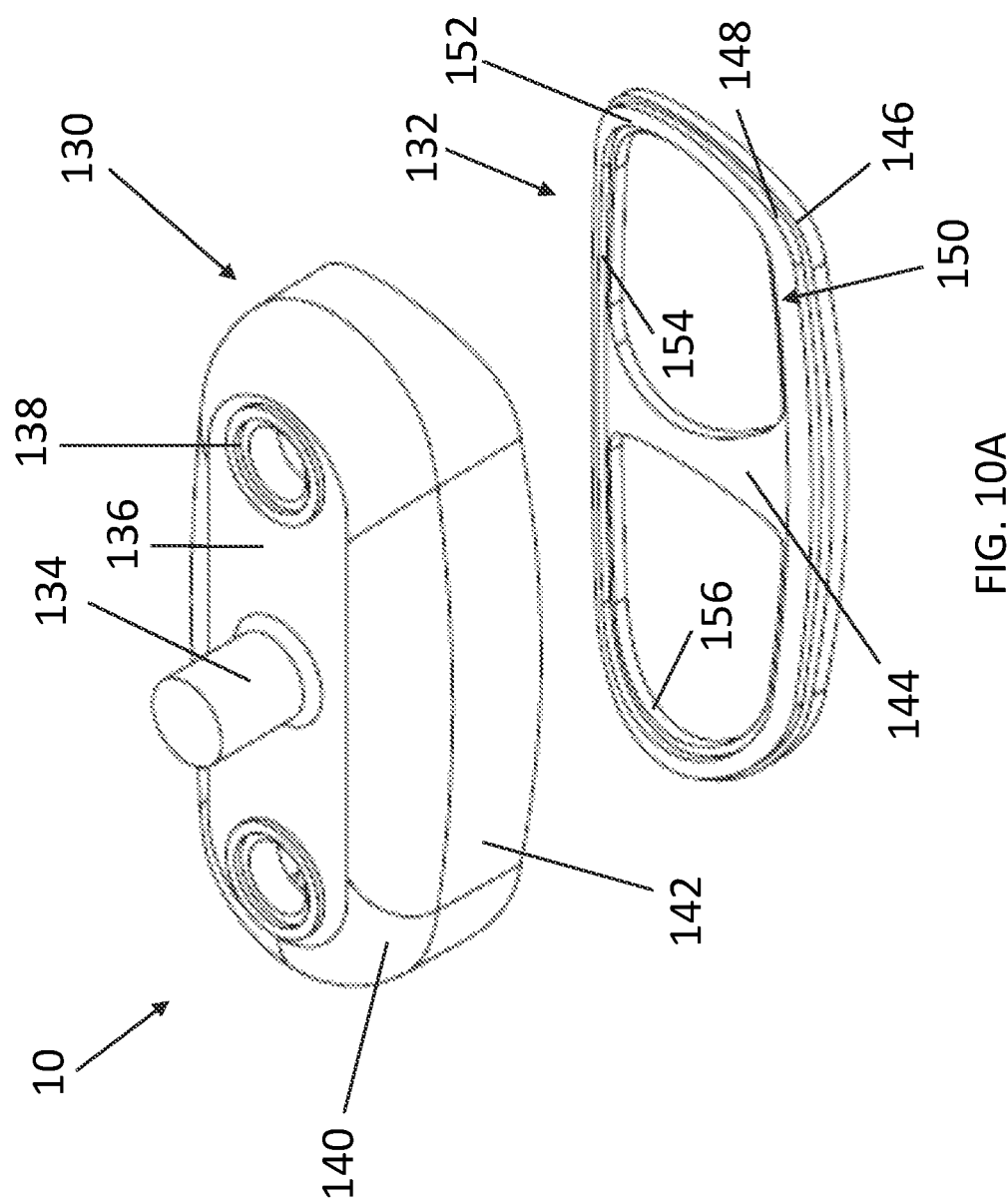
FIG. 10A is a perspective view from the top of the components of another embodiment of the zero caulk standoff of the present invention comprising a zero caulk anchor bracket and a zero caulk oval ridged sealing washer.

In a further embodiment of the zero caulk standoff 10, an anchor bracket 130 and oval ridged sealing washer 132 are mated and interlock to form a watertight seal. The anchor bracket 130 may be made of smooth polished stainless steel or rigid plastic to prevent crevices or irregular surfaces or be made of other antibacterial and/or antimicrobial material. The oval ridged sealing washer 132 may be of elastomeric material that may have antibacterial and/or antimicrobial properties. As shown in FIG. 10A, the anchor bracket 130 has an extended oval shape with a center pedestal 134. An upper surface 136 extends from the center pedestal 134 and two bolt holes 138 extend through the upper surface 136. Rounded edges 140 extend from the upper surface 136 to sidewalls 142 that form the base of the anchor bracket 130. The oval ridged sealing washer 132 is formed with an upper surface 144 that extends to an edge 146. At a short distance from the edge 146 along the perimeter of the upper surface 144, the outer sidewall 148 of the oval ridge 150 extends with a top 152 and an inner sidewall 154 that extends from the top 152 of the ridge 150 to the upper surface 146. Openings are formed through the oval ridged sealing washer 132 with an interior edge 156 of the oval ridged sealing washer 132 surrounding the openings. The openings provide for the anchor bracket 130 and oval ridged sealing washer 132 to be placed over and seal mounting hardware of various types.

Figure 10E:
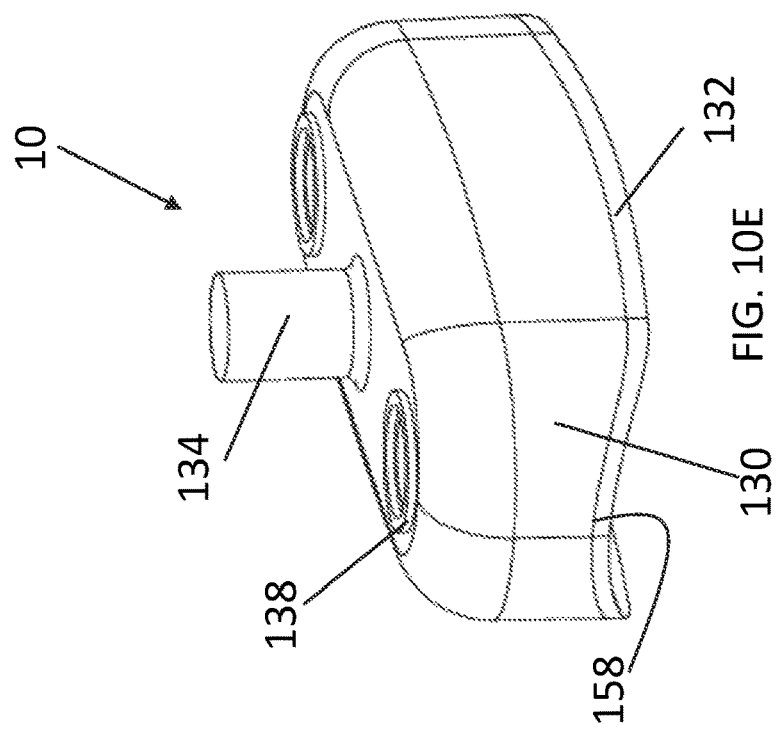
FIG. 10E is a perspective view of the assembled embodiment of the zero caulk standoff of FIG. 10A.
Figure 10D:
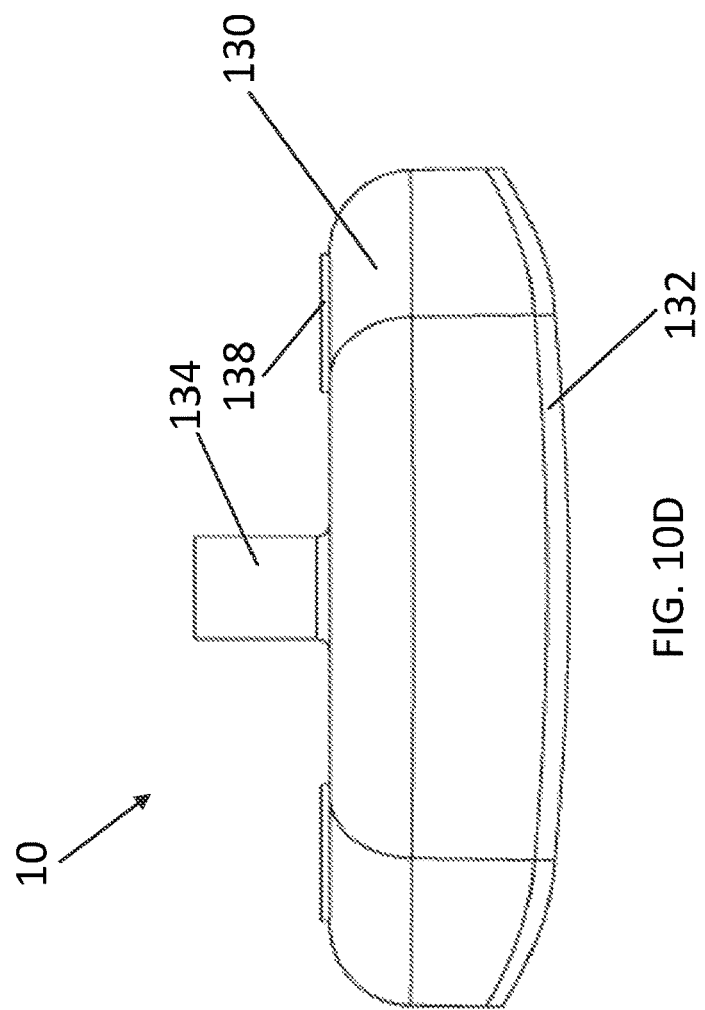
FIG. 10D is a side elevation view of the assembled embodiment of the zero caulk standoff of FIG. 10A.
Figure 10F:
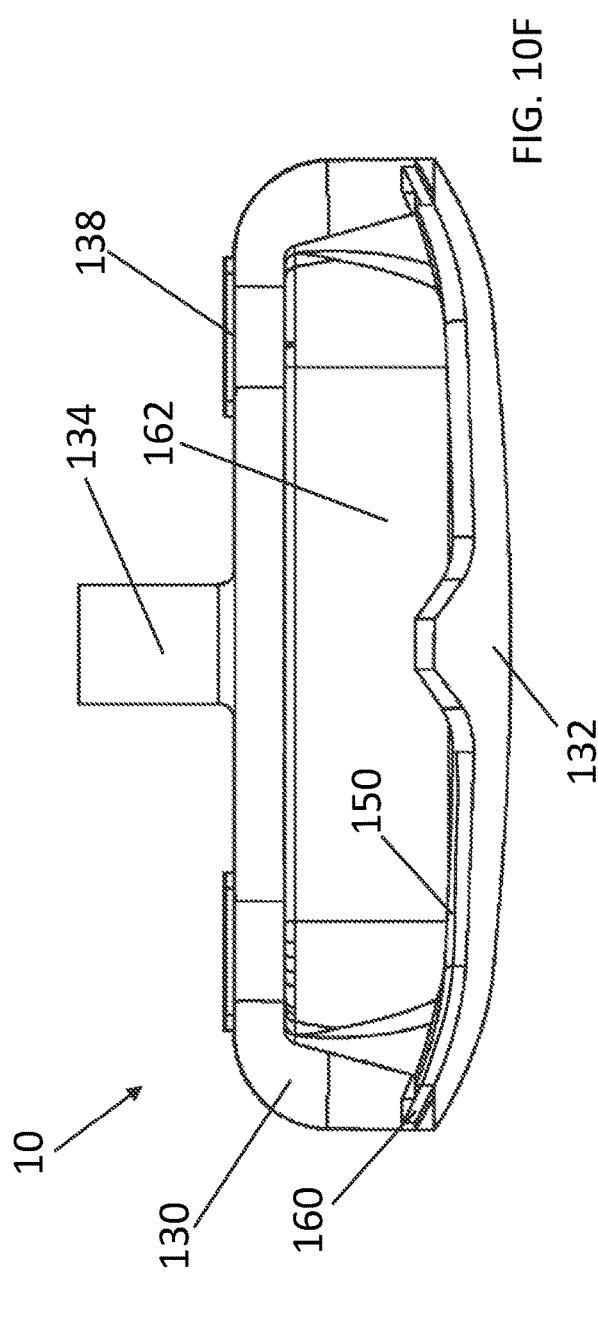
FIG. 10F is a cross-sectional view from the side of an assembled embodiment of the zero caulk standoff of FIG. 10A.
Figure 10G:
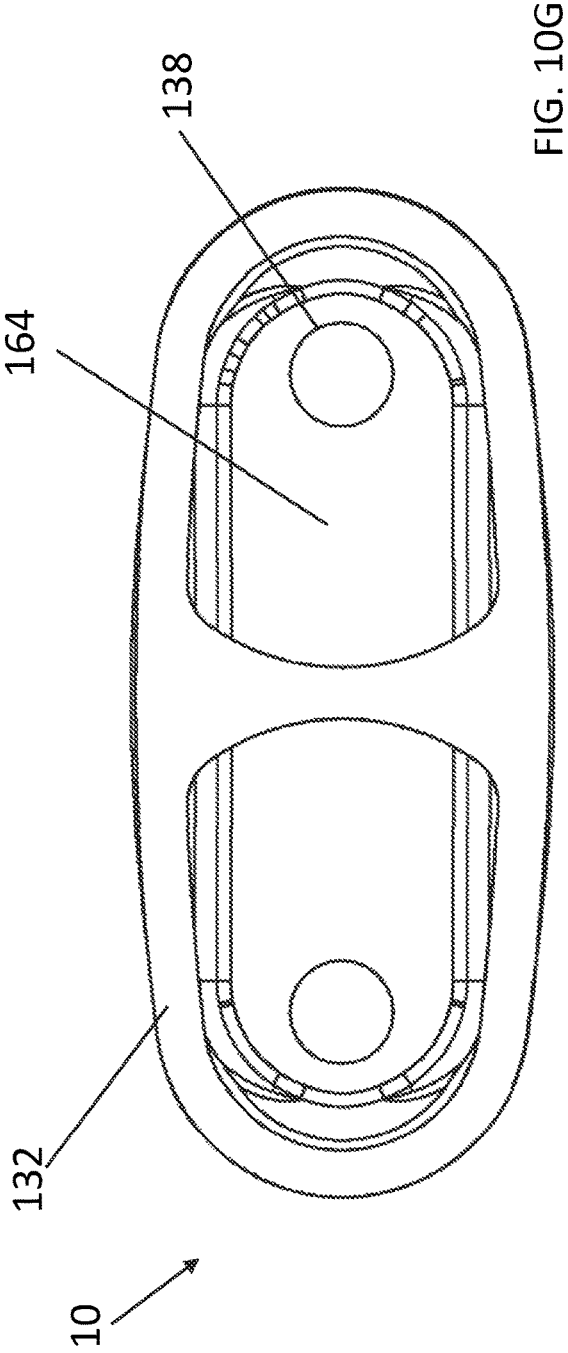
FIG. 10G is a bottom view of the assembled embodiment of the zero caulk standoff of FIG. 10A.

As shown in in a side elevation view if FIG. 10B, the oval ridged sealing washer is similar in dimension to the anchor bracket 130 extending the same length along the side to each end of the anchor bracket 130. The bottom surface 158 of the anchor bracket 130 may be flat or have either a convex or concave curvature as shown in FIG. 10C. The oval ridged sealing washer 132 has a curvature to mate with the curvature of the bottom surface 158 of the anchor bracket 130. A side elevation view of this embodiment of the zero caulk standoff 10 that comprises an anchor bracket 130 and ridged sealing washer 132 is shown in FIG. 10D and a perspective view of this embodiment of the zero caulk standoff 10 is shown in FIG. 10E. As shown in a cross-sectional view in FIG. 10F, a channel 160 is formed along the perimeter of the anchor bracket 130. The channel is configured to mate with the ridge 150 of the zero caulk ridged sealing washer 132 to interlock and form a watertight seal. The interior walls 162 and lower surface 164 of the anchor bracket 130 shown in a bottom view in FIG. 10G form a cavity with the wide openings providing space to cover and seal various type of mounting hardware. In some embodiments, the bottom surface 158 of the anchor bracket 130 and ridged sealing washer 132 are flat to interlock and seal mounting hardware on walls, floors, ceilings, IMP, or other flat surfaces.

In a further embodiment of the zero caulk standoff 10, the pedestal 134 of the anchor bracket 130 may hold a zero caulk cradle bracket 170 that is mated with a zero caulk curved sealing pad 172 to support a pipe and seal the irregular surfaces of nut, bolts, or other types of mounting hardware to prevent the buildup of dirt, liquid, bacteria, and other contaminants. The zero caulk cradle bracket 170 may be made of smooth polished stainless steel or rigid plastic to prevent crevices or irregular surfaces or be made of other antibacterial and/or antimicrobial material. The zero caulk curved sealing pad 172 may be of elastomeric material that may have antibacterial and/or antimicrobial properties.

As shown in FIG. 11A, a zero caulk cradle bracket 170 is mounted, supported on, or otherwise affixed to the pedestal 134. The zero caulk cradle bracket 170 has a curved upper surface 174 with a threaded opening 176 configured for bolt fastening or for the attachment of other types of mounting hardware. The channel 178 is formed near the outer perimeter of and within the curved upper surface 174 extending from an interior sidewall 180 to an outer wall 182 with a sealing surface 184 along the outer wall 182. The zero caulk curved sealing pad 172 is formed with a curvature configured to mated with the curvature of upper surface 174 of the zero caulk cradle bracket 170. A ridge 186 extends from the bottom surface 188 near the perimeter along the edge 190 of the zero caulk sealing pad 172. The ridge 186 is configured to mate with the channel 178 of the zero caulk cradle bracket 170 and interlock to form a watertight seal. An opening 192 is formed through the zero caulk sealing pad 172 with the opening in alignment with the opening 176 in the zero caulk cradle bracket 170 and configured for the insertion of mounting hardware through the zero caulk sealing pad 172. A bottom view of the components of this embodiment of the zero caulk standoff 10 is shown in FIG. 11B. As shown in FIG. 11C, when assembled the pedestal 134 provides an extension for placement of a pipe away from the surface that the anchor bracket 130 and oval ridged sealing washer 132 are mounted to. As shown in FIG. 11D, the anchor bracket 130 interlocks with the oval ridged sealing washer 132 to form a watertight seal around mounting hardware when attached to piping, tubing or other curved surfaces. In some embodiments, the bottom surface 158 of the anchor bracket 130 and ridged sealing washer 132 are flat to interlock and seal mounting hardware on walls, floors, ceilings, IMP, or other flat surfaces. The zero caulk sealing pad 172 is seated within the zero caulk cradle bracket 170 to seal around mounting hardware and curved surfaces of piping, tubing, or other curved surfaces. A side elevation view of this embodiment of the zero caulk standoff 10 comprising the zero caulk cradle bracket 170 and zero caulk sealing pad 172 is shown in FIG. 11E. A cross-sectional view in FIG. 11F, shows the cylindrical wall 194 that may form the cavity for mounting hardware attached to the zero caulk cradle bracket 170. The sidewalls 162 and structure of the larger cavity that is formed within the anchor bracket 130 to cover and seal various types of mounting hardware is also shown.

Figure 12:
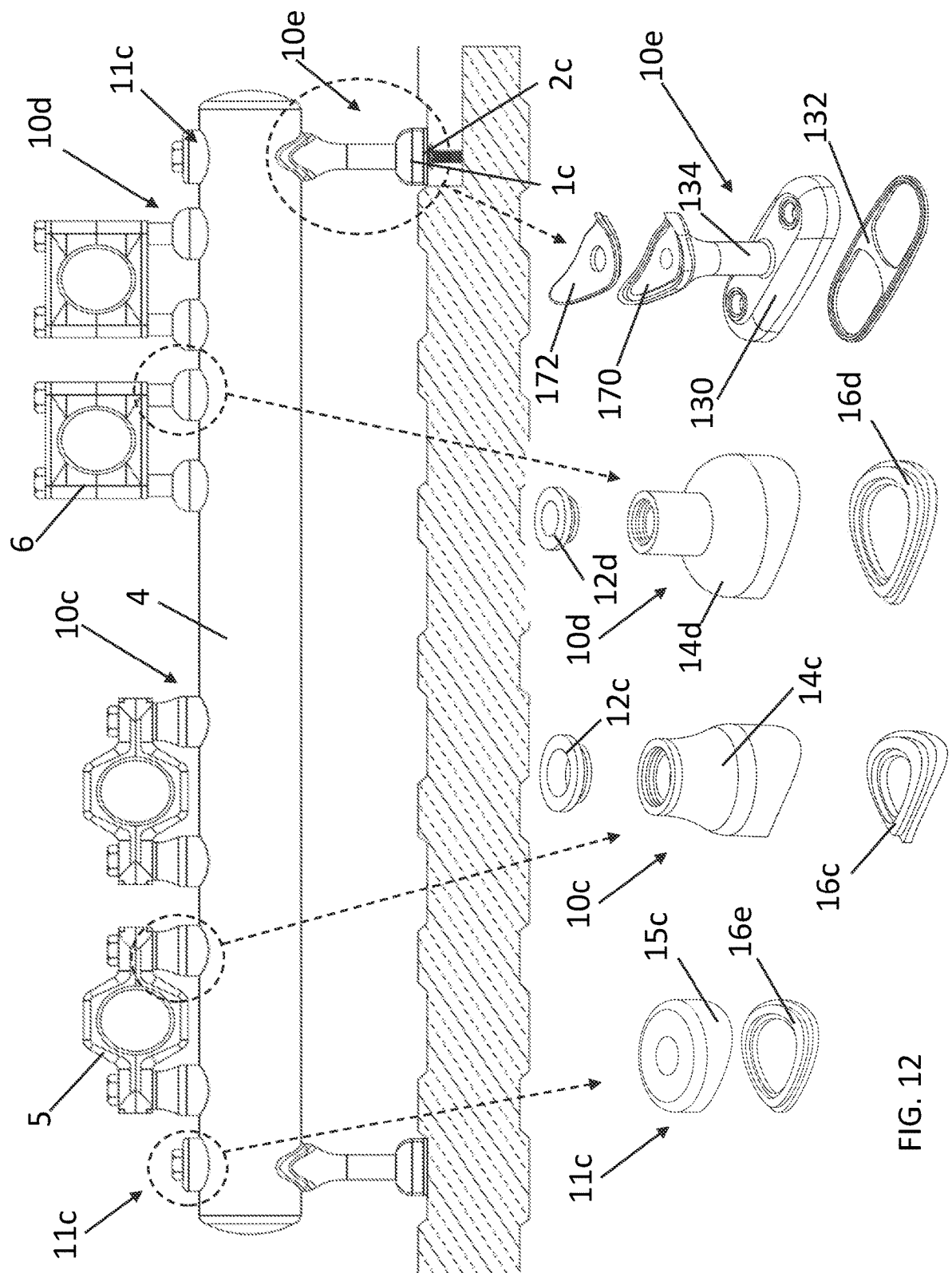
FIG. 12 is an assembled view of embodiments of the zero caulk standoff with a pipe, IMP, pipe brackets, block-style pipe hangers and mounting hardware with the exploded views of the components of different embodiments of the zero caulk standoff of the present invention.

In FIG. 12, exploded views of various embodiments of the zero caulk standoff 10c and 10d and 10e, and a zero caulk washer 11c are shown with installed views with mounting hardware and piping. Two pipe brackets 5 are supported on the embodiment of the zero caulk standoff 10c comprising another embodiment of a zero caulk gasket 12c, another embodiment of the zero caulk spacer 14c, and another embodiment of the curved ridged seal 16c. Two block-style hanger 6 are supported on the embodiment of the zero caulk standoff 10d. The zero caulk standoff 10d comprising another embodiment of a zero caulk gasket 12d, another embodiment of the zero caulk spacer 14d, and another embodiment of the curved ridged seal 16d. The two pipe brackets 5 and two block-style hanger 6 are mounted to the pipe 4. The zero caulk washer 11c comprises another embodiment of the zero caulk washer cap 15c and another embodiment of the curved ridge seal 16e. The zero caulk washer 11c seals the mounting hardware and the openings in the pipe 4. The pipe 4 is supported on another embodiment of the zero caulk standoff 10e, comprising an anchor bracket 130, a ridged sealing washer 132, a pedestal 134, a zero caulk cradle bracket 170, and a zero caulk curved sealing pad 172 and the pipe 4 is anchored to an IMP 3 using bolt 2c. The bolt 2c and opening in the pipe 4 for bolt 2b is sealed with the embodiment of the zero caulk washer 11c. As noted above the cutaway shows the embodiment of the zero caulk standoff 10e sealing the bottom opening in the pipe 4, the lower portion of the bolt 2c, and the upper portion of the jack nut 1c. Importantly, the components of each of the embodiments of the zero caulk standoffs and zero caulk washer are configured to be mixed and matched to have the appropriate combinations of curvature on one or both of the top and bottom of the standoff or washer and to have the features and dimensions to suit the installation requirements of the piping system, As an example, a zero caulk curved ridged seal 16 may be used with a zero caulk spacer 14 having any shape of neck, body and base as long as the dimensions and curvature of each are matched and the components together meet the sanitary environment conditions and requirements.

While the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof

What is claimed is:

1. A hygienically sealable standoff, comprising:
a cylindrical spacer configured to enclose and seal mounting hardware for piping, tubing, and other curved surfaces, the cylindrical spacer having at least one end surface formed circumferentially around a cylindrical opening of the spacer, the at least one end surface formed with a curvature configured for mounting the cylindrical spacer along a curved surface of a pipe, the at least one curved circumferential end surface having an inner sealing surface extending to an interior sidewall, the interior sidewall extending within the at least one end surface of the cylindrical spacer to an outer sidewall forming a channel extending circumferentially within and along the curvature of the at least one end surface of the cylindrical spacer, the curved circumferential channel configured for insertion of a curved circumferential ridge of a circular seal;
a circular seal formed circumferentially around an opening with a curvature matching the curvature of the at least one curved circumferential end surface of the cylindrical spacer, the curved circular seal having a first curved circumferential surface and a second curved circumferential surface, the first curved circumferential surface formed with an interior sidewall extending from an interior sealing surface, the interior sidewall extending to a sealing surface, the sealing surface extending to an exterior sidewall, the exterior sidewall extending to an exterior sealing surface, the interior sidewall, the sealing surface, and the exterior sidewall forming a curved circumferential ridge, the ridge dimensioned for insertion and sealing within the curved circumferential channel of the at least one curved circumferential end surface of the cylindrical spacer, the second curved circumferential surface of the circular seal configured for mounting along a curved surface of a pipe to form a watertight seal; and
wherein the curved circumferential channel of the at least one end curved circumferential surface of the cylindrical spacer and the curved circumferential ridge of the curved circular seal interlock to form a watertight seal along a curved surface of a pipe to enclose and seal mounting hardware within the cylindrical spacer; and
wherein the cylindrical spacer having a second end surface formed circumferentially around the cylindrical opening of the spacer, the second end surface formed with a curvature configured for mounting the cylindrical spacer along a curved surface of a pipe, the second end surface having an inner sealing surface extending to an interior sidewall, the interior sidewall extending within the second end surface of the cylindrical spacer to an outer sidewall forming a channel extending circumferentially within and along the curvature of the second end surface of the cylindrical spacer, the curved circumferential channel configured for insertion of a curved circumferential ridge of a circular seal;
a second circular seal formed circumferentially around an opening with a curvature matching the curvature of the second curved circumferential end surface, the curved circular seal having a first curved circumferential surface and a second curved circumferential surface, the first curved circumferential surface formed with an interior sidewall extending from an interior sealing surface, the interior sidewall extending to a sealing surface, the sealing surface extending to an exterior sidewall, the exterior sidewall extending to an exterior sealing surface, the interior sidewall, the sealing surface, and the exterior sidewall forming a curved circumferential ridge, the ridge dimensioned for insertion and sealing within the curved circumferential channel of the second end surface of the cylindrical spacer, the second curved circumferential surface of the circular seal configured for mounting along a curved surface of a pipe to form a watertight seal; and wherein interlocking the curved circumferential channel of the second end surface with the second curved circumferential ridge forms a watertight seal along a curved surface of a second pipe to enclose and seal mounting hardware within the cylindrical spacer.

2. The hygienically sealable standoff of claim 1, wherein; the spacer formed from metal or rigid plastic having antibacterial and/or antimicrobial properties.

3. The hygienically sealable standoff of claim 1, wherein; the circular seal formed from elastomeric material having antibacterial and/or antimicrobial properties, the circular seal configured for compression within the channel.

4. The hygienically sealable standoff of claim 1, wherein; the curvature of the at least one end surface of the spacer forming a first curved surface and the curvature of the second end surface of the space forming a second curved surface; and
the circular seal having a curved surface matching the first curved surface of the spacer;
the second circular seal having a curved surface matching the second curved surface of the spacer; and
wherein the first curved surface of the spacer interlocking with the matching first curved surface of the circular seal configured to direct a first pipe in one direction; and
wherein the second curved surface of the spacer interlocked with the matching curved surface of the second circular seal configured to direct a pipe in a different direction from the direction of the first pipe.

5. The hygienically sealable standoff of claim 1, wherein the watertight seal formed by interlocking the channel of the spacer with the ridge of the circular seal does not require the use of caulk, adhesives, acrylic latex, silicone, polyurethane, rubber, or other sealing compounds.

6. The hygienically sealable standoff of claim 1 wherein the axis of the curvature of the cylindrical spacer is parallel to the axis of curvature of the pipe; and
the axis of the cylindrical opening is perpendicular to the axis of curvature of the pipe.

7. The hygienically sealable standoff of claim 1 wherein the axis of the curvature of the circumferential surface of the circular seal is parallel to the axis of curvature of the pipe; and
the axis of the opening of the circular seal is perpendicular to the axis of curvature of the pipe.

8. The hygienically sealable standoff of claim 1 wherein the axis of the curvature of the second end surface of the cylindrical spacer is formed perpendicular to the axis of curvature of a pipe; and
the axis of the cylindrical opening is perpendicular to the axis of curvature of the pipe.

9. The hygienically sealable standoff of claim 1 wherein the axis of curvature of the circumferential surface of the second circular seal is parallel to the axis of curvature of a second pipe and the axis of the opening of the circular seal is perpendicular to the axis of curvature of the second pipe.

10. The hygienically sealable standoff of claim 1 wherein the mounting hardware comprising nuts, jack nuts, and anchor brackets.

* * * * *